United States Patent
Yang et al.

(10) Patent No.: US 9,246,620 B2
(45) Date of Patent: Jan. 26, 2016

(54) METHOD AND APPARATUS FOR TRANSMITTING ACK/NACK IN A TDD-BASED WIRELESS COMMUNICATION SYSTEM

(75) Inventors: Suck Chel Yang, Anyang-si (KR); Joon Kui Ahn, Anyang-si (KR); Dong Youn Seo, Anyang-si (KR); Min Gyu Kim, Anyang-si (KR)

(73) Assignee: LG ELECTRONICS INC., Seoul (KR)

(*) Notice: Subject to any disclaimer, the term of this patent is extended or adjusted under 35 U.S.C. 154(b) by 142 days.

(21) Appl. No.: 13/883,872

(22) PCT Filed: Dec. 15, 2011

(86) PCT No.: PCT/KR2011/009685
§ 371 (c)(1),
(2), (4) Date: May 7, 2013

(87) PCT Pub. No.: WO2012/081920
PCT Pub. Date: Jun. 21, 2012

(65) Prior Publication Data
US 2013/0242822 A1 Sep. 19, 2013

Related U.S. Application Data

(60) Provisional application No. 61/423,104, filed on Dec. 15, 2010, provisional application No. 61/424,055, filed on Dec. 17, 2010, provisional application No. 61/426,494, filed on Dec. 22, 2010, provisional application No. 61/429,740, filed on Jan. 4, 2011, provisional application No. 61/441,243, filed on Feb. 9, 2011, provisional application No. 61/445,980, filed on Feb. 23, 2011.

(51) Int. Cl.
*H04J 3/00* (2006.01)
*H04J 3/16* (2006.01)
*H04W 92/00* (2009.01)
(Continued)

(52) U.S. Cl.
CPC ............ *H04J 3/1694* (2013.01); *H04J 13/0074* (2013.01); *H04L 1/1607* (2013.01); *H04L 1/1692* (2013.01); *H04L 1/1812* (2013.01); *H04L 1/1861* (2013.01); *H04L 5/0055* (2013.01); *H04L 2001/125* (2013.01); *H04W 72/04* (2013.01)

(58) Field of Classification Search
CPC ...... H04J 3/16; H04J 13/0074; H04L 1/1607; H04L 1/1812; H04L 1/1861; H04L 5/0055
USPC .................................. 370/280, 329; 455/450
See application file for complete search history.

(56) References Cited

U.S. PATENT DOCUMENTS

2012/0099491 A1* 4/2012 Lee et al. ...................... 370/280

OTHER PUBLICATIONS

Motorola, Uplink ACK/NACK for Carrier Aggregation, 3GPP TSG RAN1#60, San Francisco, USA, Feb. 22-26, 2010, R1-101468.*

(Continued)

*Primary Examiner* — Chi H Pham
*Assistant Examiner* — Shailendra Kumar
(74) *Attorney, Agent, or Firm* — Birch, Stewart, Kolasch & Birch, LLP

(57) ABSTRACT

Provided are a method and an apparatus for transmitting ACK/NACK in a time division duplex (TDD)-based wireless communication system. A terminal receives zero or more downlink transmission blocks in M downlink subframes from a first serving cell, and determines an ACK/NACK state {HARQ-ACK(1),HARQ-ACK(2),HARQ-ACK(3),HARQ-ACK(4)} for the first serving cell. The terminal determines an ACK/NACK response based on said ACK/NACK state, and transmits the ACK/NACK response in an uplink subframe.

7 Claims, 15 Drawing Sheets

(51) Int. Cl.
H04L 1/16 (2006.01)
H04L 1/18 (2006.01)
H04J 13/00 (2011.01)
H04W 72/04 (2009.01)
H04L 1/12 (2006.01)
H04L 5/00 (2006.01)

(56) References Cited

OTHER PUBLICATIONS

Samsung, PUCCH HARQ-ACK Signal Transmission for DL CA, 3GPP TSG RAN WG1 #61, Montreal, Canada, May 10-14, 2010, R1-103397.*

LG Electronics, ACK/NACK resource allocation in LTE-A, 3GPP TSG RAN WG1 #60bis, Beijing, China, Apr. 12-16, 2010, R1-102170.*

LG Electronics, Uplink ACK/NACK resource allocation in TDD, 3GPP TSG RAN WG1 #52bis, Shenzhen, China, Mar. 31-Apr. 4, 2008, R1-081257.*

Huawei and HiSilicon, ACK/NACK mapping tables for channel selection 3GPP TSG RAN WG1 Meeting #62bis, Xi'an, China, Oct. 11-15, 2010.*

ZTE, on ACK/NACK bundling in LTE-A TDD, 3GPP TSG RAN WG1 Meeting #62bis, Xi'an, China, Oct. 11-15, 2010.*

Motorola, Uplink ACK/NACK for Carrier Aggregation, 3GPP TSG RAN1#60, San Francisco, USA, Feb. 22-26, 2010.*

Samsung, PUCCH HARQ-ACK Signal Transmission for DL CA, 3GPP TSG RAN WG1 #60bis, Beijing, China, Apr. 12-16, 2010.*

LG Electronics, ACK/NACK resource allocation in LTE-A, 3GPP TSG RAN WG1 #61, Montreal, Canada, May 10-14, 2010.*

3rd Generation Partnership Project; Technical Specification Group Radio Access Network; Evolved Universal Terrestrial Radio Access (E-UTRA); Physical layer procedures (Release 9), 3GPP TS 36.213 V9.3.0 (Sep. 2010).*

LG Electronics, "ACK/NACK resource allocation in LTE-A", 3GPP TSG RAN WG1 #61, May 10-14, 2010, R1-103397, 5 pages.

LG Electronics, "Uplink ACK/NACK resource allocation in TDD", 3GPP TSG RAN WG1 #52bis, Mar. 31-Apr. 4, 2008, R1-081257, 5 pages.

Motorola, "Uplink ACK/NACK for Carrier Aggregation", 3GPP TSG RAN1#60, Feb. 22-26, 2010, R1-101468, 3 pages.

Huawei et al., "ACK/NACK mapping tables for channel selection," 3GPP TSG RAN WG1 Meeting #62bis, Oct. 11-15, 2010, 10 pages.

ZTE, "On ACK/NACK bundling in LTE-ATDD," 3GPP TSG RAN WG1 Meeting #62bis, Oct. 11-15, 2010, pp. 1-6.

* cited by examiner

METHOD AND APPARATUS FOR TRANSMITTING ACK/NACK IN A TDD-BASED WIRELESS COMMUNICATION SYSTEM

CROSS REFERENCE TO RELATED APPLICATIONS

This application is the National Phase of PCT/KR2011/009685 filed on Dec. 15, 2011, which claims priority under 35 U.S.C. 119(e) to U.S. Provisional Application Nos. 61/423,104 filed on Dec. 15, 2010, 61/424,055 filed on Dec. 17, 2010, 61/426,494 filed on Dec. 22, 2010, 61/429,740 filed on Jan. 4, 2011, 61/441,243 filed on Feb. 9, 2011 and 61/445,980 filed on Feb. 23, 2011 all of which are hereby expressly incorporated by reference into the present application.

BACKGROUND OF THE INVENTION

1. Field of the Invention

The present invention relates to wireless communications, and more particularly, to a method and apparatus for transmitting a reception acknowledgement for hybrid automatic repeat request (HARQ) in a wireless communication system based on time division duplex (TDD).

2. Related Art

Long term evolution (LTE) based on $3^{rd}$ generation partnership project (3GPP) technical specification (TS) release 8 is a promising next-generation mobile communication standard.

As disclosed in 3GPP TS 36.211 V8.7.0 (2009-05) "Evolved Universal Terrestrial Radio Access (E-UTRA); Physical Channels and Modulation (Release 8)", a physical channel of the LTE can be classified into a downlink channel, i.e., a physical downlink shared channel (PDSCH) and a physical downlink control channel (PDCCH), and an uplink channel, i.e., a physical uplink shared channel (PUSCH) and a physical uplink control channel (PUCCH).

The PUCCH is an uplink control channel used for transmission of an uplink control signal such as a hybrid automatic repeat request (HARQ) positive-acknowledgement (ACK)/negative-acknowledgement (NACK) signal, a channel quality indicator (CQI), and a scheduling request (SR).

Meanwhile, 3GPP LTE-advanced (A) which is an evolution of 3GPP LTE is under development. Examples of techniques employed in the 3GPP LTE-A include carrier aggregation and multiple input multiple output (MIMO) supporting four or more antenna ports.

The carrier aggregation uses a plurality of component carriers. The component carrier is defined with a center frequency and a bandwidth. One downlink component carrier or a pair of an uplink component carrier and a downlink component carrier is mapped to one cell. When a user equipment receives a service by using a plurality of downlink component carriers, it can be said that the user equipment receives the service from a plurality of serving cells.

A time division duplex (TDD) system uses the same frequency in downlink and uplink cases. Therefore, one or more downlink subframes are associated with an uplink subframe. The 'association' implies that transmission/reception in the downlink subframe is associated with transmission/reception in the uplink subframe. For example, when a transport block is received in a plurality of downlink subframes, the user equipment transmits HARQ ACK/NACK for the transport block in the uplink subframe associated with the plurality of downlink subframes.

With the introduction of a plurality of serving cells in the TDD system, a payload of the HARQ ACK/NACK is increased in size. It is important to increase transmission reliability of the HARQ ACK/NACK to guarantee reliability when performing HARQ. However, if the payload of the HARQ ACK/NACK is excessively great, it is difficult to increase a data rate for user traffic.

Accordingly, there is a need for a method capable of decreasing the increased payload of the HARQ ACK/NACK while maintaining transmission reliability of the HARQ ACK/NACK.

SUMMARY OF THE INVENTION

The present invention provides a method and apparatus for transmitting positive-acknowledgement (ACK)/negative-acknowledgement (NACK) in a wireless communication system based on time division duplex (TDD).

In an aspect, a method of transmitting a ACK/NACK in a wireless communication system based on Time Division Duplex in which M, M=4, downlink subframes are associated with an uplink subframe is provided. The method includes receiving, by a user equipment, zero or more downlink transport block in the M downlink subframes from a first serving cell, determining, by the user equipment, ACK/NACK states {HARQ-ACK(1),HARQ-ACK(2),HARQ-ACK(3), HARQ-ACK(4)} for the first serving cell, determining, by the user equipment, a ACK/NACK response based on the ACK/NACK states, and transmitting, by the user equipment, the ACK/NACK response in the uplink subframe. Each downlink transport block is received on each physical downlink shared channel (PDSCH) and a PDSCH is indicated by a downlink resource assignment in a downlink grant on a corresponding physical downlink control channel (PDCCH), and the downlink grant includes a downlink assignment index (DAI) which indicates a accumulative number of PDCCH with assigned PDSCH transmission. The ACK/NACK states {HARQ-ACK(1),HARQ-ACK(2),HARQ-ACK(3), HARQ-ACK(4)} is one of (A, A, A, N/D), (A, A, N/D, any), (A, D, D, D), (A, A, A, A), (N/D, any, any, any) and (A, N/D, any, any) except for (A, D, D, D), where 'A' indicates ACK for corresponding downlink transport block, 'N' indicates NACK for corresponding downlink transport block, 'D' indicates no transmission (DTX) in corresponding downlink subframe, 'any' indicates any of ACK, NACK and DTX. HARQ-ACK(j), j=1, 2, 3, 4, is ACK/NACK/DTX for corresponding downlink transport block on PDSCH with a DAI value j in the corresponding PDCCH if there is no PDSCH transmission without corresponding PDCCH.

If there is a PDSCH transmission without corresponding PDCCH in the first serving cell, HARQ-ACK(1) for the first serving cell may be ACK/NACK/DTX for corresponding downlink transport block at the PDSCH without corresponding PDCCH. HARQ-ACK(j), j=2, 3, 4, for the first serving cell may be ACK/NACK/DTX for corresponding downlink transport block on PDSCH with a DAI values j−1 in the corresponding PDCCH.

The method may further include receiving, by the user equipment, zero or more downlink transport block in the M downlink subframes from a second serving cell, and determining, by the user equipment, ACK/NACK states {HARQ-ACK(1), HARQ-ACK(2), HARQ-ACK(3), HARQ-ACK(4)} for the second serving cell.

In another aspect, a wireless device configured for transmitting a ACK/NACK in a wireless communication system based on Time Division Duplex in which M, M=4, downlink subframes are associated with an uplink subframe is provided. The wireless device include a radio frequency unit configured to transmit radio signals, and a processor operatively coupled with the radio frequency unit and configured to receive at least one downlink transport block in the M downlink subframe for each of a plurality of serving cells from a base station, receive zero or more downlink transport block in the M downlink subframes from a first serving cell, determine ACK/NACK states {HARQ-ACK(1), HARQ-ACK(2), HARQ-ACK(3), HARQ-ACK(4)} for the first serving cell, determining, by the user equipment, a ACK/NACK response based on the ACK/NACK states, and transmit the ACK/NACK response in the uplink subframe.

A method of transmitting a reception acknowledgement in a time division duplex (TDD) system having a plurality of serving cells is proposed. An error caused by positive-acknowledgement (ACK)/negative-acknowledgement (NACK) mismatch between a base station and a user equipment can be reduced.

DESCRIPTION OF EXEMPLARY EMBODIMENTS

A user equipment (UE) may be fixed or mobile, and may be referred to as another terminology, such as a mobile station (MS), a mobile terminal (MT), a user terminal (UT), a subscriber station (SS), a wireless device, a personal digital assistant (PDA), a wireless modem, a handheld device, etc.

A base station (BS) is generally a fixed station that communicates with the UE and may be referred to as another terminology, such as an evolved node-B (eNB), a base transceiver system (BTS), an access point, etc.

Figure 1:
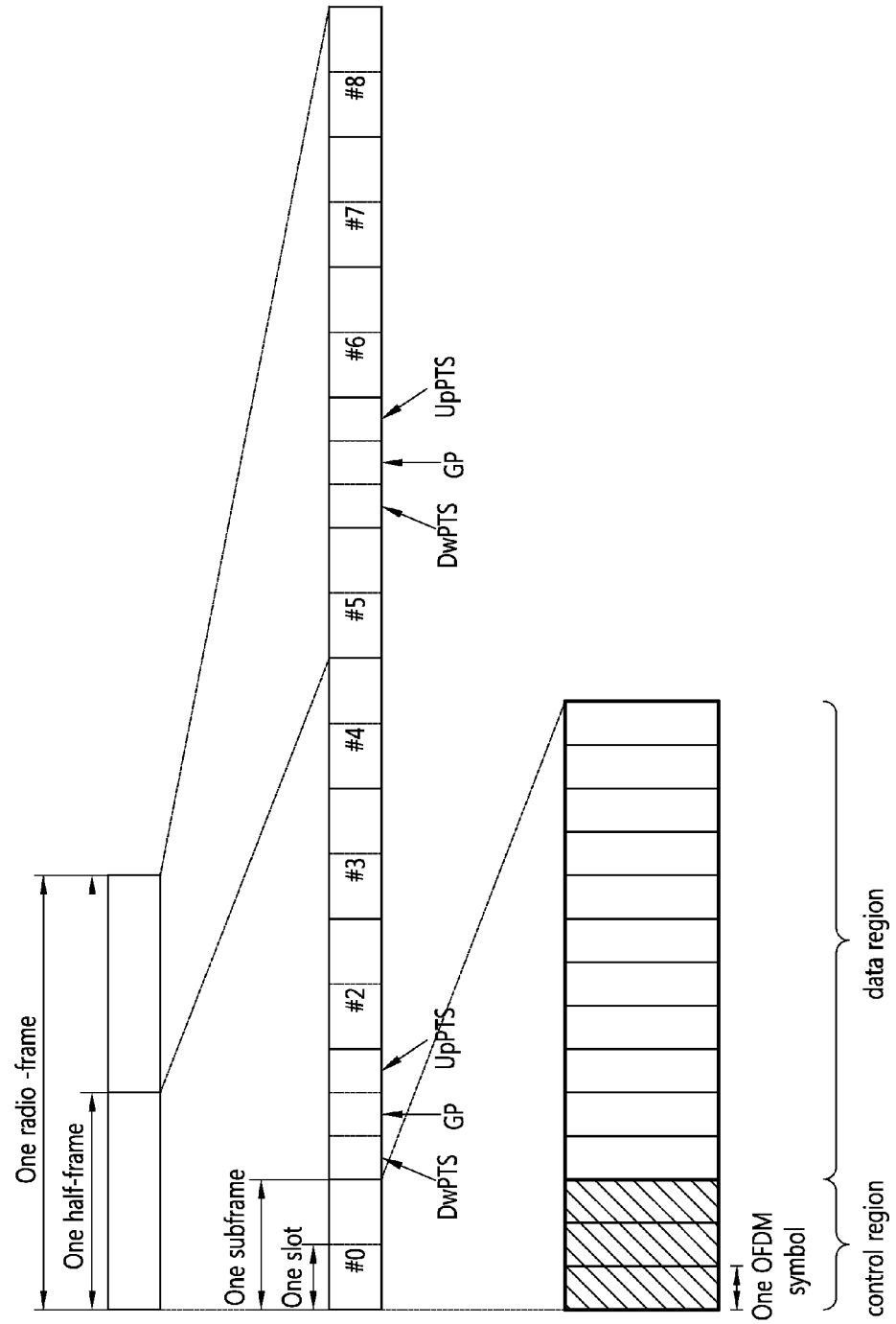
FIG. 1 shows a downlink radio frame structure in $3^{rd}$ generation partnership project (3GPP) long term evolution (LTE).

FIG. 1 shows a downlink radio frame structure in $3^{rd}$ generation partnership project (3GPP) long term evolution (LTE). The section 4 of 3GPP TS 36.211 V8.7.0 (2009-05) "Evolved Universal Terrestrial Radio Access (E-UTRA); Physical Channels and Modulation (Release 8)" may be incorporated herein by reference.

A radio frame includes 10 subframes indexed with 0 to 9. One subframe includes 2 consecutive slots. A time required for transmitting one subframe is defined as a transmission time interval (TTI). For example, one subframe may have a length of 1 millisecond (ms), and one slot may have a length of 0.5 ms.

One slot may include a plurality of orthogonal frequency division multiplexing (OFDM) symbols in a time domain. Since the 3GPP LTE uses orthogonal frequency division multiple access (OFDMA) in a downlink (DL), the OFDM symbol is only for expressing one symbol period in the time domain, and there is no limitation in a multiple access scheme or terminologies. For example, the OFDM symbol may also be referred to as another terminology such as a single carrier frequency division multiple access (SC-FDMA) symbol, a symbol period, etc.

Although it is described that one slot includes 7 OFDM symbols for example, the number of OFDM symbols included in one slot may vary depending on a length of a cyclic prefix (CP). According to 3GPP TS 36.211 V8.7.0, in case of a normal CP, one slot includes 7 OFDM symbols, and in case of an extended CP, one slot includes 6 OFDM symbols.

A resource block (RB) is a resource allocation unit, and includes a plurality of subcarriers in one slot. For example, if one slot includes 7 OFDM symbols in a time domain and the RB includes 12 subcarriers in a frequency domain, one RB can include 7×12 resource elements (REs).

A subframe having an index #1 and an index #6 is called a special subframe, and includes a downlink pilot time slot (DwPTS), a guard period (GP), and an uplink pilot time slot (UpPTS). The DwPTS is used in the UE for initial cell search, synchronization, or channel estimation. The UpPTS is used in the BS for channel estimation and uplink transmission synchronization of the UE. The GP is a period for removing interference which occurs in an uplink due to a multi-path delay of a downlink signal between the uplink and a downlink.

In TDD, a downlink (DL) subframe and an uplink (UL) subframe co-exist in one radio frame. Table 1 shows an example of a configuration of the radio frame.

TABLE 1

| UL-DL configuration | Switch-point periodicity | Subframe index | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

'D' denotes a DL subframe, 'U' denotes a UL subframe, and 'S' denotes a special subframe. When the UL-DL configuration is received from the BS, the UE can know whether a specific subframe is the DL subframe or the UL subframe according to the configuration of the radio frame.

A DL subframe is divided into a control region and a data region in the time domain. The control region includes up to three preceding OFDM symbols of a $1^{st}$ slot in the subframe. However, the number of OFDM symbols included in the control region may vary. A physical downlink control channel (PDCCH) is allocated to the control region, and a physical downlink shared channel (PDSCH) is allocated to the data region.

As disclosed in 3GPP TS 36.211 V8.7.0, the 3GPP LTE classifies a physical channel into a data channel and a control channel. Examples of the data channel include a physical downlink shared channel (PDSCH) and a physical uplink shared channel (PUSCH). Examples of the control channel include a physical downlink control channel (PDCCH), a physical control format indicator channel (PCFICH), a physical hybrid-ARQ indicator channel (PHICH), and a physical uplink control channel (PUCCH).

The PCFICH transmitted in a $1^{st}$ OFDM symbol of the subframe carries a control format indicator (CFI) regarding the number of OFDM symbols (i.e., a size of the control region) used for transmission of control channels in the subframe. The UE first receives the CFI on the PCFICH, and thereafter monitors the PDCCH.

Unlike the PDCCH, the PCFICH does not use blind decoding, and is transmitted by using a fixed PCFICH resource of the subframe.

The PHICH carries a positive-acknowledgement (ACK)/negative-acknowledgement (NACK) signal for an uplink hybrid automatic repeat request (HARQ). The ACK/NACK signal for uplink (UL) data on a PUSCH transmitted by the UE is transmitted on the PHICH.

A physical broadcast channel (PBCH) is transmitted in first four OFDM symbols in a $2^{nd}$ slot of a $1^{st}$ subframe of a radio frame. The PBCH carries system information necessary for communication between the UE and the BS. The system information transmitted through the PBCH is referred to as a master information block (MIB). In comparison thereto, system information transmitted on the PDCCH is referred to as a system information block (SIB).

Control information transmitted through the PDCCH is referred to as downlink control information (DCI). The DCI may include resource allocation of the PDSCH (this is referred to as a DL grant), resource allocation of a PUSCH (this is referred to as a UL grant), a set of transmit power control commands for individual UEs in any UE group, and/or activation of a voice over Internet protocol (VoIP).

The 3GPP LTE uses blind decoding for PDCCH detection. The blind decoding is a scheme in which a desired identifier is de-masked from a cyclic redundancy check (CRC) of a received PDCCH (referred to as a candidate PDCCH) to determine whether the PDCCH is its own control channel by performing CRC error checking.

The BS determines a PDCCH format according to DCI to be transmitted to the UE, attaches a CRC to the DCI, and masks a unique identifier (referred to as a radio network temporary identifier (RNTI)) to the CRC according to an owner or usage of the PDCCH.

Figure 2:
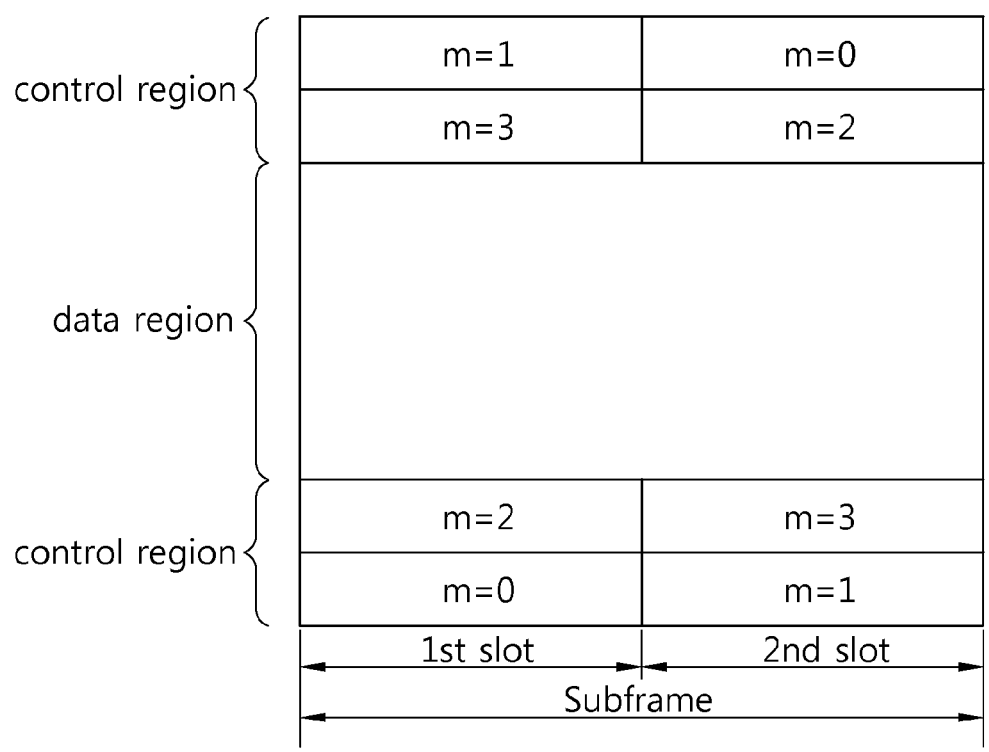
FIG. 2 shows an example of an uplink subframe in 3GPP LTE.

FIG. 2 shows an example of a UL subframe in 3GPP LTE.

The UL subframe can be divided into a control region and a data region. The control region is a region to which a physical uplink control channel (PUCCH) carrying UL control information is assigned. The data region is a region to which a physical uplink shared channel (PUSCH) carrying user data is assigned.

The PUCCH is allocated in an RB pair in a subframe. RBs belonging to the RB pair occupy different subcarriers in each of a $1^{st}$ slot and a $2^{nd}$ slot. m is a location index indicating a logical frequency-domain location of the RB pair allocated to the PUCCH in the subframe. It shows that RBs having the same value m occupy different subcarriers in the two slots.

According to 3GPP TS 36.211 V8.7.0, the PUCCH supports multiple formats. A PUCCH having a different number of bits per subframe can be used according to a modulation scheme which is dependent on the PUCCH format.

Table 2 below shows an example of a modulation scheme and the number of bits per subframe according to the PUCCH format.

TABLE 2

| PUCCH format | Modulation scheme | Number of bits per subframe |
|---|---|---|
| 1 | N/A | N/A |
| 1a | BPSK | 1 |
| 1b | QPSK | 2 |
| 2 | QPSK | 20 |
| 2a | QPSK + BPSK | 21 |
| 2b | QPSK + BPSK | 22 |

The PUCCH format 1 is used for transmission of a scheduling request (SR). The PUCCH formats 1a/1b are used for transmission of an ACK/NACK signal. The PUCCH format 2 is used for transmission of a CQI. The PUCCH formats 2a/2b are used for simultaneous transmission of the CQI and the ACK/NACK signal. When only the ACK/NACK signal is transmitted in a subframe, the PUCCH formats 1a/1b are used. When the SR is transmitted alone, the PUCCH format 1 is used. When the SR and the ACK/NACK are simultaneously transmitted, the PUCCH format 1 is used, and in this transmission, the ACK/NACK signal is modulated by using a resource allocated to the SR.

All PUCCH formats use a cyclic shift (CS) of a sequence in each OFDM symbol. The cyclically shifted sequence is generated by cyclically shifting a base sequence by a specific CS amount. The specific CS amount is indicated by a CS index.

An example of a base sequence $r_u(n)$ is defined by Equation 1 below.

$$r_u(n) = e^{jb(n)\pi/4} \qquad \text{[Equation 1]}$$

In Equation 1, u denotes a root index, and n denotes a component index in the range of $0 \le n \le N-1$, where N is a length of the base sequence. $b(n)$ is defined in the section 5.5 of 3GPP TS 36.211 V8.7.0.

A length of a sequence is equal to the number of elements included in the sequence. u can be determined by a cell identifier (ID), a slot number in a radio frame, etc. When it is assumed that the base sequence is mapped to one RB in a frequency domain, the length N of the base sequence is 12 since one RB includes 12 subcarriers. A different base sequence is defined according to a different root index.

The base sequence $r(n)$ can be cyclically shifted by Equation 2 below to generate a cyclically shifted sequence $r(n, I_{cs})$.

$$r(n, I_{cs}) = r(n) \cdot \exp\left(\frac{j 2\pi I_{cs} n}{N}\right), \quad 0 \le I_{cs} \le N-1 \qquad \text{[Equation 2]}$$

In Equation 2, $I_{cs}$ denotes a CS index indicating a CS amount ($0 \le I_{cs} \le N-1$).

Hereinafter, the available CS of the base sequence denotes a CS index that can be derived from the base sequence according to a CS interval. For example, if the base sequence has a length of 12 and the CS interval is 1, the total number of available CS indices of the base sequence is 12. Alternatively, if the base sequence has a length of 12 and the CS interval is 2, the total number of available CS indices of the base sequence is 6.

Now, transmission of an HARQ ACK/NACK signal in the PUCCH format 1b will be described.

Figure 3:
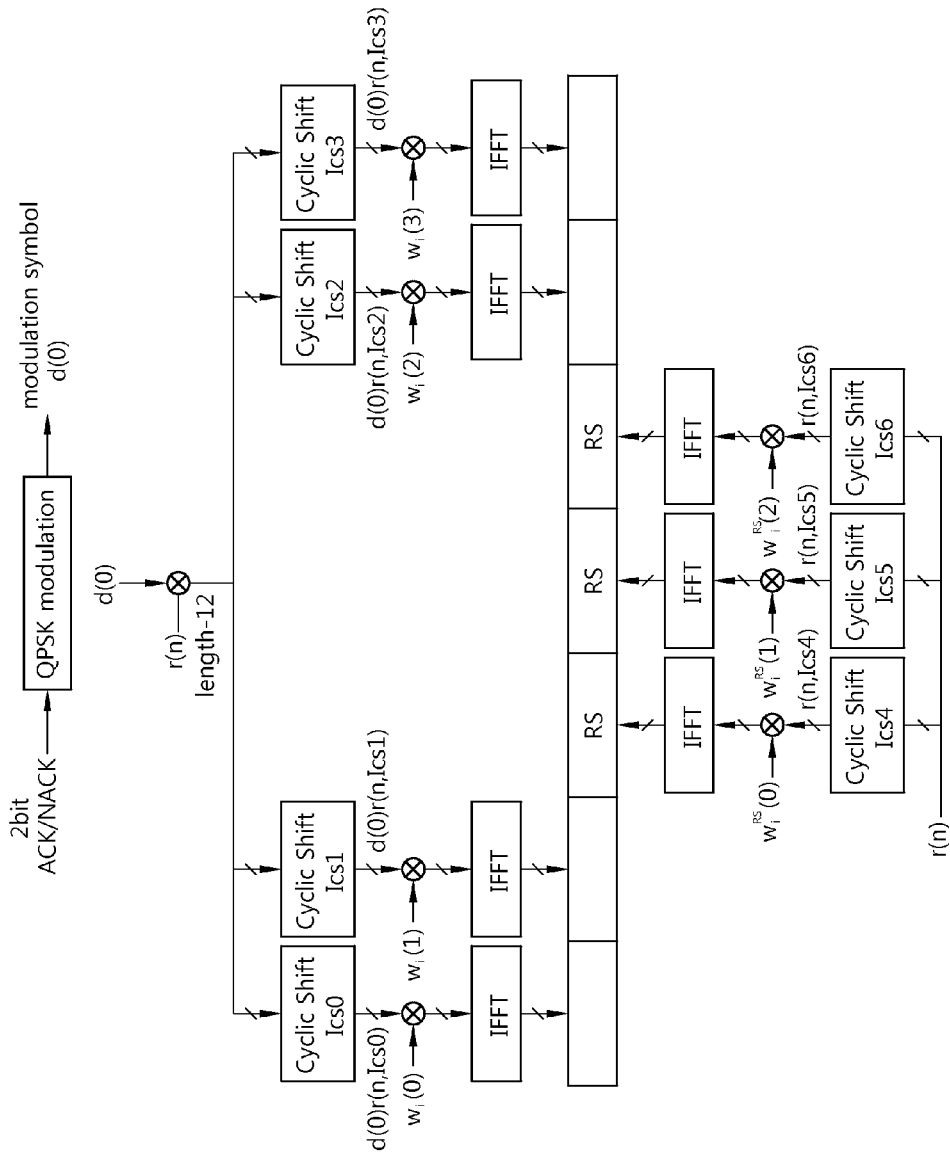
FIG. 3 shows a physical uplink control channel (PUCCH) format 1b in a normal cyclic prefix (CP) in 3GPP LTE.

FIG. 3 shows a PUCCH format 1b in a normal CP in 3GPP LTE.

One slot includes 7 OFDM symbols. Three OFDM symbols are used as reference signal (RS) OFDM symbols for a reference signal. Four OFDM symbols are used as data OFDM symbols for an ACK/NACK signal.

In the PUCCH format 1b, a modulation symbol d(0) is generated by modulating a 2-bit ACK/NACK signal based on quadrature phase shift keying (QPSK).

A CS index $I_{cs}$ may vary depending on a slot number $n_s$ in a radio frame and/or a symbol index l in a slot.

In the normal CP, there are four data OFDM symbols for transmission of an ACK/NACK signal in one slot. It is assumed that CS indices mapped to the respective data OFDM symbols are denoted by $I_{cs0}$, $I_{cs1}$, $I_{cs2}$, and $I_{cs3}$.

The modulation symbol d(0) is spread to a cyclically shifted sequence $r(n,I_{cs})$. When a one-dimensionally spread sequence mapped to an $(i+1)^{th}$ OFDM symbol in a subframe is denoted by m(i), it can be expressed as follows.

$$\{m(0),m(1),m(2),m(3)\}=\{d(0)r(n,I_{cs0}),d(0)r(n,I_{cs1}),d(0)r(n,I_{cs2}),d(0)r(n,I_{cs3})\}$$

In order to increase UE capacity, the one-dimensionally spread sequence can be spread by using an orthogonal sequence. An orthogonal sequence $w_i(k)$ (where i is a sequence index, $0 \leq k \leq K-1$) having a spread factor K=4 uses the following sequence.

TABLE 3

| Index (i) | $[w_i(0), w_i(1), w_i(2), w_i(3)]$ |
| --- | --- |
| 0 | [+1, +1, +1, +1] |
| 1 | [+1, −1, +1, −1] |
| 2 | [+1, −1, −1, +1] |

An orthogonal sequence $w_i(k)$ (where i is a sequence index, $0 \leq k \leq K-1$) having a spread factor K=3 uses the following sequence.

TABLE 4

| Index (i) | $[w_i(0), w_i(1), w_i(2)]$ |
| --- | --- |
| 0 | [+1, +1, +1] |
| 1 | $[+1, e^{j2\pi/3}, e^{j4\pi/3}]$ |
| 2 | $[+1, e^{j4\pi/3}, e^{j2\pi/3}]$ |

A different spread factor can be used for each slot.

Therefore, when any orthogonal sequence index i is given, a two-dimensionally spread sequences $\{s(0), s(1), s(2), s(3)\}$ can be expressed as follows.

$$\{s(0),s(1),s(2),s(3)\}=\{w_i(0)m(0),w_i(1)m(1),w_i(2)m(2),w_i(3)m(3)\}$$

The two-dimensionally spread sequences $\{s(0), s(1), s(2), s(3)\}$ are subjected to inverse fast Fourier transform (IFFT) and thereafter are transmitted in corresponding OFDM symbols. Accordingly, an ACK/NACK signal is transmitted on a PUCCH.

A reference signal for the PUCCH format 1b is also transmitted by cyclically shifting the base sequence r(n) and then by spreading it by the use of an orthogonal sequence. When CS indices mapped to three RS OFDM symbols are denoted by $L_{cs4}$, $I_{cs5}$, and $I_{cs6}$, three cyclically shifted sequences $r(n,I_{cs4})$, $r(n,I_{cs5})$, and $r(n,I_{cs6})$ can be obtained. The three cyclically shifted sequences are spread by the use of an orthogonal sequence $w^{RS}_i(k)$ having a spreading factor K=3.

An orthogonal sequence index i, a CS index $I_{cs}$, and a resource block index m are parameters required to configure the PUCCH, and are also resources used to identify the PUCCH (or UE). If the number of available cyclic shifts is 12 and the number of available orthogonal sequence indices is 3, PUCCHs for 36 UEs in total can be multiplexed with one resource block.

In the 3GPP LTE, a resource index $n^{(1)}_{PUUCH}$ is defined in order for the UE to obtain the three parameters for configuring the PUCCH. The resource index $n^{(1)}_{PUUCH}$ is defined to $n_{CCE}+N^{(1)}_{PUUCH}$, where $n_{CCE}$ is an index of a first CCE used for transmission of corresponding DCI (i.e., DL resource allocation used to receive DL data mapped to an ACK/NACK signal), and $N^{(1)}_{PUUCH}$ is a parameter reported by a BS to the UE by using a higher-layer message.

Time, frequency, and code resources used for transmission of the ACK/NACK signal are referred to as ACK/NACK resources or PUCCH resources. As described above, an index of the ACK/NACK resource required to transmit the ACK/NACK signal on the PUCCH (referred to as an ACK/NACK resource index or a PUCCH index) can be expressed with at least any one of an orthogonal sequence index i, a CS index $I_{cs}$, a resource block index m, and an index for obtaining the three indices. The ACK/NACK resource may include at least one of an orthogonal sequence, a cyclic shift, a resource block, and a combination thereof.

Figure 4:
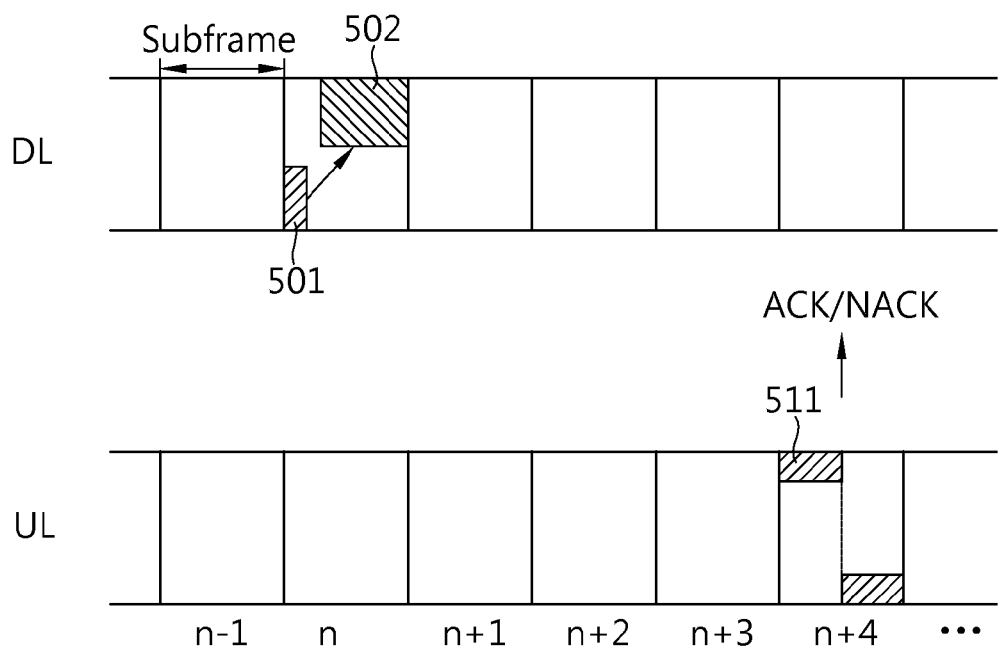
FIG. 4 shows an example of performing hybrid automatic repeat request (HARQ).

FIG. 4 shows an example of performing HARQ.

By monitoring a PDCCH, a UE receives a DL grant including a DL resource allocation on a PDCCH 501 in an $n^{th}$ DL subframe. The UE receives a DL transport block through a PDSCH 502 indicated by the DL resource allocation.

The UE transmits an ACK/NACK response for the DL transport block on a PUCCH 511 in an $(n+4)^{th}$ UL subframe. The ACK/NACK response can be regarded as a reception acknowledgement for a DL transport block.

The ACK/NACK signal corresponds to an ACK signal when the DL transport block is successfully decoded, and corresponds to a NACK signal when the DL transport block fails in decoding. Upon receiving the NACK signal, a BS may retransmit the DL transport block until the ACK signal is received or until the number of retransmission attempts reaches its maximum number.

In the 3GPP LTE, to configure a resource index of the PUCCH 511, the UE uses a resource allocation of the PDCCH 501. That is, a lowest CCE index (or an index of a first CCE) used for transmission of the PDCCH 501 is $n_{CCE}$, and the resource index is determined as $n^{(1)}_{PUUCH}=n_{CCE}+N^{(1)}_{PUUCH}$.

Now, a multiple-carrier system will be described.

A 3GPP LTE system supports a case in which a DL bandwidth and a UL bandwidth are differently configured under the premise that one component carrier (CC) is used. The 3GPP LTE system supports up to 20 MHz, and the UL bandwidth and the DL bandwidth may be different from each other. However, only one CC is supported in each of UL and DL cases.

Spectrum aggregation (or bandwidth aggregation, also referred to as carrier aggregation) supports a plurality of CCs. For example, if 5 CCs are assigned as a granularity of a carrier unit having a bandwidth of 20 MHz, a bandwidth of up to 100 MHz can be supported.

One DL CC or a pair of a UL CC and a DL CC may be mapped to one cell. Therefore, when a UE communicates with a BS through a plurality of DL CCs, it can be said that the UE receives a service from a plurality of serving cells.

Figure 5:
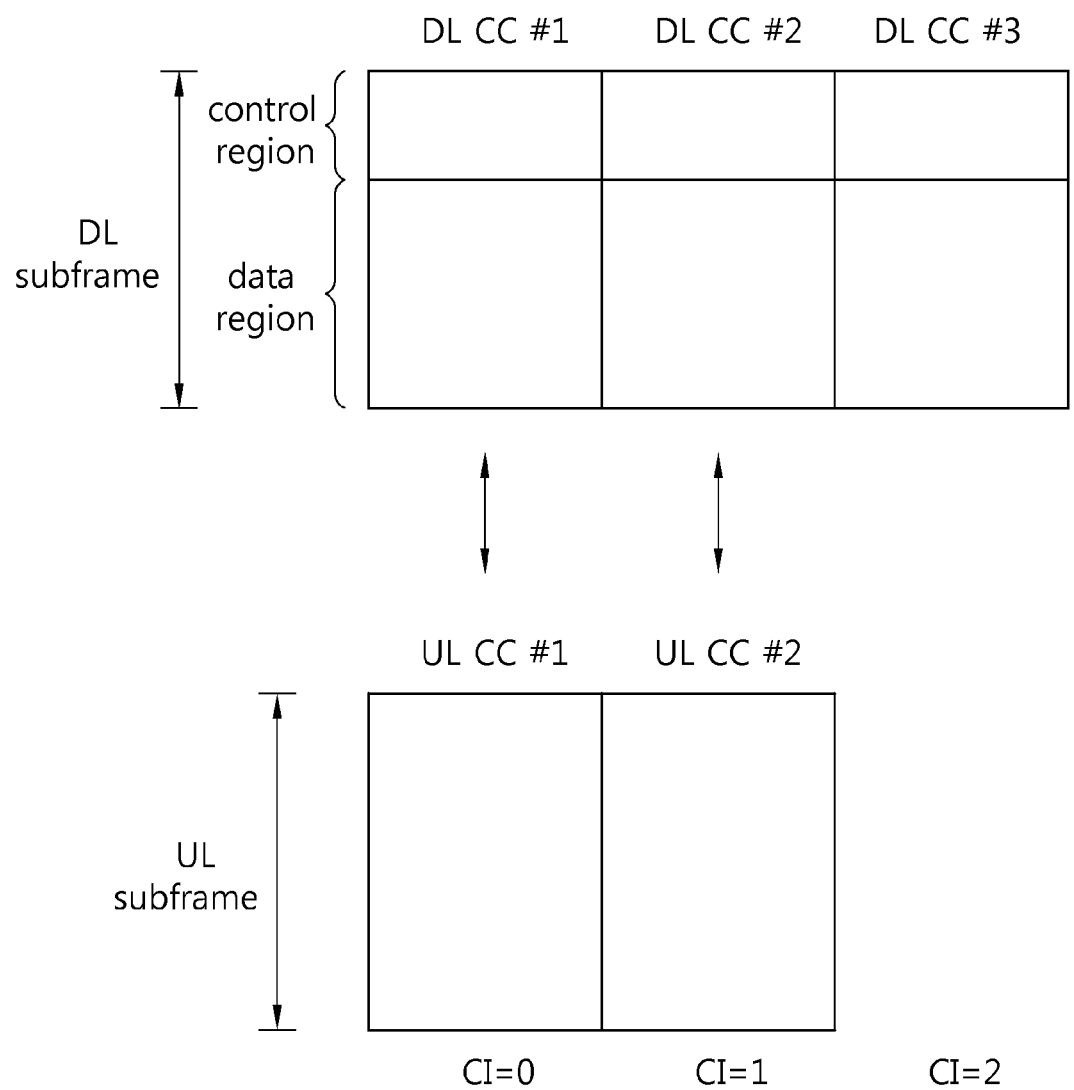
FIG. 5 shows an example of multiple carriers.

FIG. 5 shows an example of multiple carriers.

Although three DL CCs and three UL CCs are shown herein, the number of DL CCs and the number of UL CCs are not limited thereto. A PDCCH and a PDSCH are independently transmitted in each DL CC. A PUCCH and a PUSCH are independently transmitted in each UL CC. Since three DL CC-UL CC pairs are defined, it can be said that a UE receives a service from three serving cells.

The UE can monitor the PDCCH in a plurality of DL CCs, and can receive a DL transport block simultaneously via the plurality of DL CCs. The UE can transmit a plurality of UL transport blocks simultaneously via a plurality of UL CCs.

It is assumed that a pair of a DL CC #1 and a UL CC #1 is a $1^{st}$ serving cell, a pair of a DL CC #2 and a UL CC #2 is a $2^{nd}$ serving cell, and a DL CC #3 is a $3^{rd}$ serving cell. Each serving cell can be identified by using a cell index (CI). The CI may be cell-specific or UE-specific. Herein, CI=0, 1, 2 are assigned to the $1^{st}$ to $3^{rd}$ serving cells for example.

The serving cell can be classified into a primary cell and a secondary cell. The primary cell operates at a primary frequency, and is a cell designated as the primary cell when the UE performs an initial network entry process or starts a network re-entry process or performs a handover process. The primary cell is also called a reference cell. The secondary cell operates at a secondary frequency. The secondary cell can be configured after an RRC connection is established, and can be used to provide an additional radio resource. At least one primary cell is configured always. The secondary cell can be added/modified/released by higher-layer signaling (e.g., RRC messages).

The CI of the primary cell may be fixed. For example, a lowest CI can be designated as a CI of the primary cell. It is assumed hereinafter that the CI of the primary cell is 0 and a CI of the secondary cell is allocated sequentially starting from 1.

Now, ACK/NACK transmission for HARQ in 3GPP LTE time division duplex (TDD) will be described.

A UL subframe and a DL subframe coexist in one radio frame in the TDD, unlike in frequency division duplex (FDD). In general, the number of UL subframes is less than the number of DL subframes. Therefore, in preparation for a case in which the UL subframes for transmitting an ACK/NACK signal are insufficient, it is supported that a plurality of ACK/NACK signals for a plurality of DL transport blocks are transmitted in one UL subframe.

According to the section 10.1 of 3GPP TS 36.213 V8.7.0 (2009-05), two ACK/NACK modes, i.e., channel selection and bundling, are introduced.

First, the bundling is an operation in which, if all of PDSCHs (i.e., DL transport blocks) received by a UE are successfully decoded, ACK is transmitted, and otherwise NACK is transmitted. This is called an AND operation.

However, the bundling is not limited to the AND operation, and may include various operations for compressing ACK/NACK bits corresponding to a plurality of transport blocks (or codewords). For example, the bundling may indicate a count indicating the number of ACKs (or NACKs) or the number of consecutive ACKs.

Second, the channel selection is also called ACK/NACK multiplexing. The UE transmits the ACK/NACK by selecting one of a plurality of PUCCH resources.

Table 5 below shows a DL subframe n-k associated with a UL subframe n depending on the UL-DL configuration in 3GPP LTE. Herein, k∈K, where M is the number of elements of a set K.

TABLE 5

| UL-DL configuration | Subframe n | | | | | | | | |
|---|---|---|---|---|---|---|---|---|---|
| | 0 | 1 | 2 | 3 | 4 | 5 | 6 | 7 | 8 |
| 0 | — | — | 6 | — | 4 | — | — | 6 | — |
| 1 | — | — | 7, 6 | 4 | — | — | — | 7, 6 | 4 |
| 2 | — | — | 8, 7, 4, 6 | — | — | — | — | 8, 7, 4, 6 | — |
| 3 | — | — | 7, 6, 11 | 6, 5 | 5, 4 | — | — | — | — |
| 4 | — | — | 12, 8, 7, 11 | 6, 5, 4, 7 | — | — | — | — | — |
| 5 | — | — | 13, 12, 9, 8, 7, 5, 4, 11, 6 | — | — | — | — | — | — |
| 6 | — | — | 7 | 7 | 5 | — | — | 7 | 7 |

Assume that M DL subframes are associated with a UL subframe n, where M=3. Since 3 PDCCHs can be received from 3 DL subframes, the UE can acquire 3 PUCCH resources $n^{(1)}_{PUCCH,0}$, $n^{(1)}_{PUCCH,1}$, and $n^{(1)}_{PUCCH,2}$. An example of channel selection is shown in Table 6 below.

TABLE 6

| HARQ-ACK(0), HARQ-ACK(1), HARQ-ACK(2) | $n^{(1)}_{PUCCH}$ | b(0), b(1) |
|---|---|---|
| ACK, ACK, ACK | $n^{(1)}_{PUCCH,2}$ | 1, 1 |
| ACK, ACK, NACK/DTX | $n^{(1)}_{PUCCH,1}$ | 1, 1 |
| ACK, NACK/DTX, ACK | $n^{(1)}_{PUCCH,0}$ | 1, 1 |
| ACK, NACK/DTX, NACK/DTX | $n^{(1)}_{PUCCH,0}$ | 0, 1 |
| NACK/DTX, ACK, ACK | $n^{(1)}_{PUCCH,2}$ | 1, 0 |
| NACK/DTX, ACK, NACK/DTX | $n^{(1)}_{PUCCH,1}$ | 0, 0 |
| NACK/DTX, NACK/DTX, ACK | $n^{(1)}_{PUCCH,2}$ | 0, 0 |
| DTX, DTX, NACK | $n^{(1)}_{PUCCH,2}$ | 0, 1 |
| DTX, NACK, NACK/DTX | $n^{(1)}_{PUCCH,1}$ | 1, 0 |
| NACK, NACK/DTX, NACK/DTX | $n^{(1)}_{PUCCH,0}$ | 1, 0 |
| DTX, DTX, DTX | N/A | N/A |

HARQ-ACK(i) denotes ACK/NACK for an $i^{th}$ DL subframe among the M DL subframes. Discontinuous transmission (DTX) implies that a DL transport block cannot be received on a PDSCH in a corresponding DL subframe or a corresponding PDCCH cannot be detected. According to Table 3 above, there are three PUCCH resources $n^{(1)}_{PUCCH,0}$, $n^{(1)}_{PUCCH,1}$, and $n^{(1)}_{PUCCH,2}$, and b(0) and b(1) are two bits transmitted by using a selected PUCCH.

For example, if the UE successfully receives three DL transport blocks in three DL subframes, the UE performs QPSK modulation on bits (1,1) by using $n^{(1)}_{PUCCH,2}$, and transmits the modulated bits through the PUCCH. If the UE fails to decode the DL transport block and succeeds in the decoding of the remaining transport blocks in a $1^{st}$ (i=0) DL subframe, the UE transmits bits (1,0) through the PUCCH by using $n^{(1)}_{PUCCH,2}$.

In channel selection, NACK and DTX are coupled if there is at least one ACK. This is because all ACK/NACK states cannot be expressed by combining a reserved PUCCH resource and a QPSK symbol. However, if the ACK does not exist, the DTX is decoupled from the NACK.

The conventional PUCCH format 1b can transmit only 2-bit ACK/NACK. However, channel selection is used to express more ACK/NACK states by linking the allocated PUCCH resources and an actual ACK/NACK signal.

Meanwhile, if it is assumed that M DL subframes are associated with a UL subframe n, ACK/NACK may be mismatched between the BS and the UE due to missing of a DL subframe (or PDCCH).

Assume that M=3, and the BS transmits 3 DL transport blocks through 3 DL subframes. The UE misses the PDCCH in the $2^{nd}$ DL subframe and thus cannot receive a $2^{nd}$ transport block at all, and can receive only the remaining 1$^{st}$ and 3$^{rd}$ transport blocks. In this case, if bundling is used, the UE erroneously transmits ACK.

In order to solve this error, a downlink assignment index (DAI) is included in a DL grant on the PDCCH. The DAI indicates an accumulative number of the PDCCH having assigned PUSCH transmission. A value of the 2-bit DAI is sequentially increased from 1, and a modulo-4 operation is applicable again from DAI=4. If M=5 and all of 5 DL subframes are scheduled, the DAI can be included in a corresponding PDCCH in the order of DAI=1, 2, 3, 4, 1.

Figure 6:
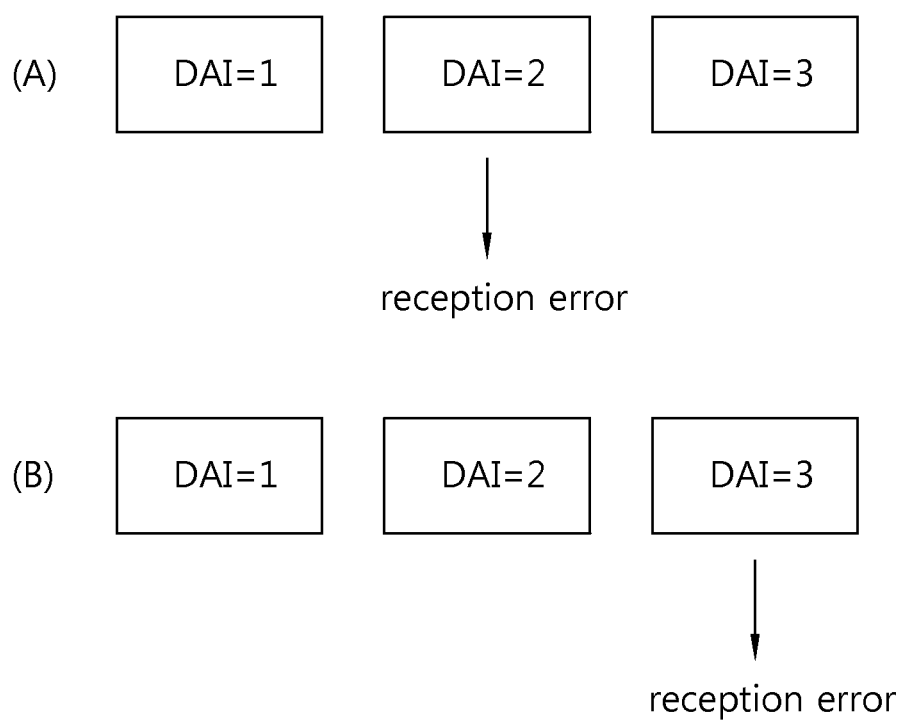
FIG. 6 shows examples of error detection using a downlink assignment index (DAI).

FIG. 6 shows examples of error detection using a DAI.

In FIG. 6A, a UE misses a 2$^{nd}$ DL subframe, and thus cannot receive DAI=2. In this case, the UE receives DAI=3, and thus can know missing of a DL subframe corresponding to DAI=2.

In FIG. 6B, the UE misses a 3$^{rd}$ DL subframe, and thus cannot receive DAI=3. In this case, the UE cannot know missing of the 3$^{rd}$ DL subframe. However, in 3GPP LTE, a PUCCH is configured on the basis of a 1$^{st}$ CCE of a last received PDCCH so that a BS can know missing of the DL subframe. That is, the UE transmits ACK/NACK by using a PUCCH resource based on a PUCCH resource of a DL subframe corresponding to DAI=2. The BS can know the missing of the 3$^{rd}$ DL subframe since the ACK/NACK is received by using the PUCCH resource corresponding to the DL subframe with DAI=2 rather than the DL subframe with DAI=3.

Meanwhile, as a plurality of serving cells are used, an additional PUCCH format 3 is under discussion in addition to the PUCCH format of the conventional 3GPP LTE, in preparation for a case in which the number of ACK/NACK bits is insufficient.

Figure 7:
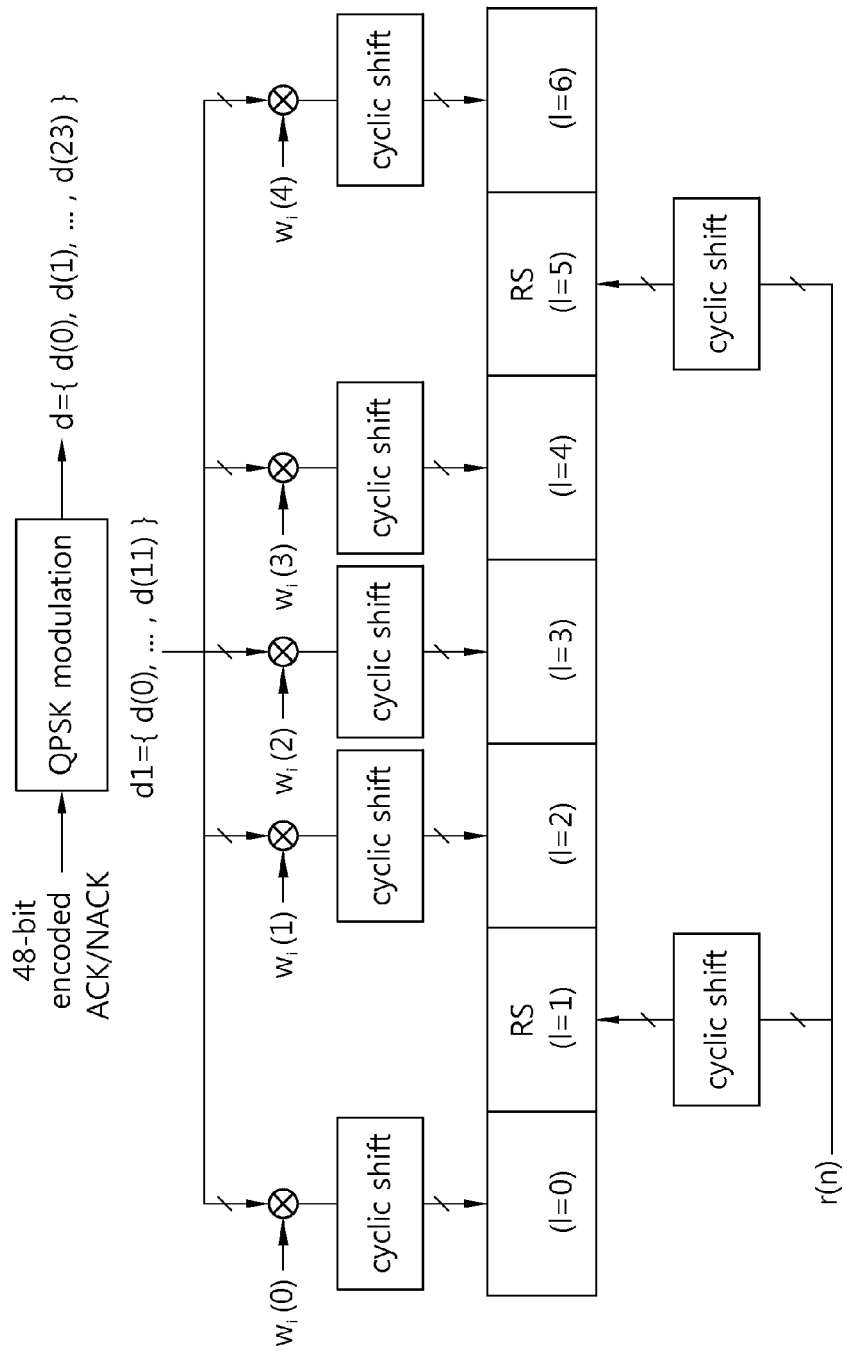
FIG. 7 shows an example of a structure of a PUCCH format 3 in a normal CP.

FIG. 7 shows an example of a structure of a PUCCH format 3 in a normal CP.

One slot includes 7 OFDM symbols. l denotes an OFDM symbol number in the slot, and has a value in the range of 0 to 6. Two OFDM symbols with l=1, 5 are used as RS OFDM symbols for a reference signal, and the remaining OFDM symbols are used as data OFDM symbols for an ACK/NACK signal.

A symbol sequence d={d(0), d(1), . . . , d(23)} is generated by performing QPSK modulation on a 48-bit encoded ACK/NACK signal. d(n)(n=0, 1, . . . , 23) is a complex-valued modulation symbol. The symbol sequence d can be regarded as a set of modulation symbols. The number of bits of the ACK/NACK signal or a modulation scheme is for exemplary purposes only, and thus the present invention is not limited thereto.

One PUCCH uses one RB, and one subframe includes a first slot and a second slot. A symbol sequence d={d(0), d(1), . . . , d(23)} is divided into two sequences d1={d(0), . . . , d(11)} and d2={d(12), . . . , d(23)}, each having a length of 12. The first sequence d1 is transmitted in the first slot, and the second sequence d2 is transmitted in the second slot. FIG. 5 shows that the first sequence d1 is transmitted in the first slot.

The symbol sequence is spread with an orthogonal sequence $w_i$. Symbol sequences are mapped to respective data OFDM symbols. An orthogonal sequence is used to identify a PUCCH (or UE) by spreading the symbol sequence across the data OFDM symbols.

The orthogonal sequence has a spreading factor K=5, and includes five elements. As the orthogonal sequence, one of five orthogonal sequences of Table 5 below can be selected in accordance with an orthogonal sequence index i.

TABLE 7

| Index (i) | [$w_i(0), w_i(1), w_i(2), w_i(3), w_i(4)$] |
|---|---|
| 0 | [+1, +1, +1, +1, +1] |
| 1 | [+1, $e^{j2\pi/5}, e^{j4\pi/5}, e^{j6\pi/5}, e^{j8\pi/5}$] |
| 2 | [+1, $e^{j4\pi/5}, e^{j8\pi/5}, e^{j2\pi/5}, e^{j6\pi/5}$] |
| 3 | [+1, $e^{j6\pi/5}, e^{j2\pi/5}, e^{j8\pi/5}, e^{j4\pi/5}$] |
| 4 | [+1, $e^{j8\pi/5}, e^{j6\pi/5}, e^{j4\pi/5}, e^{j2\pi/5}$] |

Two slots in the subframe can use different orthogonal sequence indices.

Each spread symbol sequence is cyclically shifted by a cell-specific CS value $n^{cell}_{cs}(n_s,1)$. Each cyclically shifted symbol sequence is transmitted by being mapped to a corresponding data OFDM symbol.

$n^{cell}_{cs}(n_s,1)$ is a cell-specific parameter determined by a pseudo-random sequence which is initialized on the basis of a physical cell identity (PCI). $n^{cell}_{cs}(n_s,1)$ varies depending on a slot number n, in a radio frame and an OFDM symbol number 1 in a slot.

Two RS OFDM symbols are transmitted by mapping an RS sequence used for demodulation of an ACK/NACK signal.

As described above, since the ACK/NACK signal is spread with an orthogonal sequence having a spreading factor K=5, up to five UEs can be identified by changing an orthogonal sequence index. This implies that up to five PUCCH formats 3 can be multiplexed in the same RB.

Now, semi-persistent scheduling (SPS) will be described.

In general, a UE first receives a DL grant on a PDCCH, and subsequently receives a transport block through a PDSCH indicated by the DL grant. This implies that PDCCH monitoring is accompanied in every transport block, which is called dynamic scheduling.

The SPS pre-defines a PDSCH resource, and the UE receives a transport block through the pre-defined resource without PDCCH monitoring.

Figure 8:
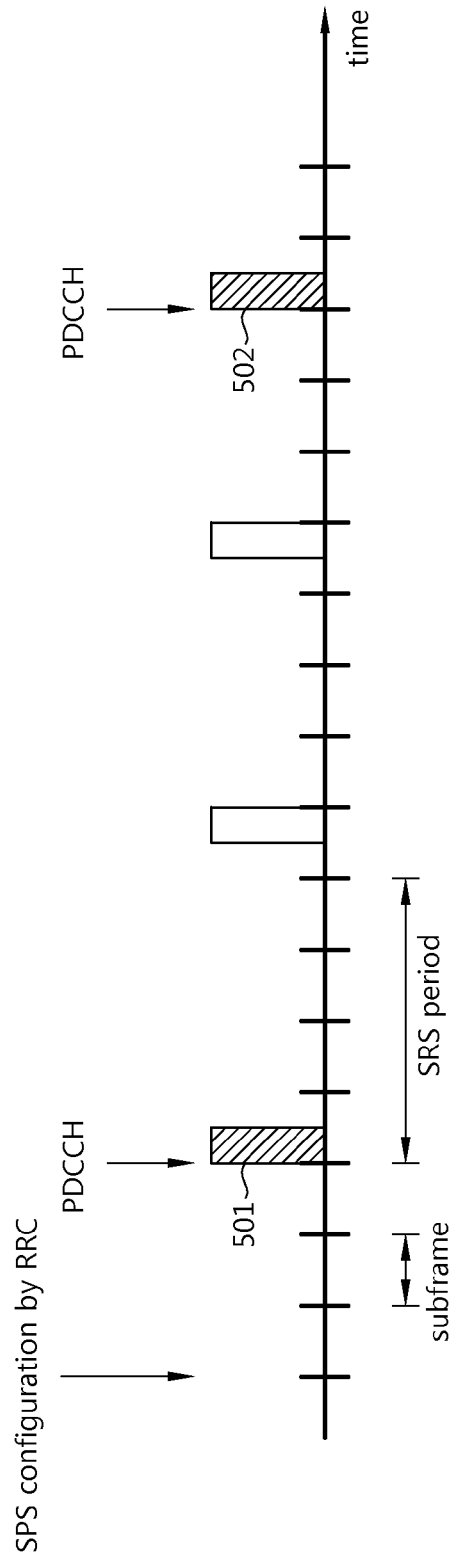
FIG. 8 shows an example of semi-persistent scheduling (SPS) in 3GPP LTE.

FIG. 8 shows an example of SPS in 3GPP LTE. Although DL SPS is shown herein, the same is also applicable to UL SPS.

First, a BS sends an SPS configuration to a UE by using radio resource control (RRC). The SPS configuration includes an SPS-C-RNTI and an SPS period. It is assumed herein that the SPS period is four subframes.

Even if the SPS is configured, the SPS is not immediately performed. The UE monitors a PDCCH 501 in which a CRC is masked with the SPS-C-RNTI, and performs the SPS after the SPS is activated. When NDI=0 is included in DCI on the PDCCH 501, combinations of values of several fields (e.g., a transmit power command (TPC), a cyclic shift (CS) of a demodulation reference signal (DMRS), a modulation and coding scheme (MCS), a redundancy version (RV), an HARQ process number, and a resource allocation) included in the DCI are used in SPS activation and deactivation.

When the SPS is activated, even if a DL grant on the PDCCH is not received, the UE receives a transport block on a PDSCH at an SPS period. The PDSCH received without the PDCCH is called an SPS PDSCH.

Thereafter, the UE monitors a PDCCH 502 in which a CRC is masked with the SPS-C-RNTI, and confirms deactivation of the SPS.

According to 3GPP LTE, the PDCCH indicating the activation of the SPS does not require an ACK/NACK response, but the PDCCH indicating the deactivation of the SPS requires the ACK/NACK response. Hereinafter, a DL transport block may include the PDCCH indicating the deactivation of the SPS.

According to the conventional PUCCH formats 1a/1b, a resource index $n^{(1)}_{PUCCH}$ is acquired from the PDCCH. However, according to the SPS, the PDCCH associated with the PDSCH is not received, and thus a pre-assigned resource index is used.

Now, ACK/NACK transmission in a TDD system according to the present invention will be described.

An ACK/NACK state for HARQ indicates one of the following three states.

ACK: a decoding success of a transport block received on a PDSCH.

NACK: a decoding failure of the transport block received on the PDSCH.

DTX: a failure in the reception of the transport block on the PDSCH. In case of dynamic scheduling, a failure in the reception of a PDCCH.

As shown in Table 5, the M DL subframes are associated with the UL subframe n according to the UL-DL configuration. In this case, in order to express all of the three states in the UL subframe n, at least 2M bits are required for ACK/NACK transmission.

In order to express the ACK/NACK by using a smaller number of bits, an ACK/NACK multiplexing method may be considered as follows.

(1) Bundled ACK: If the number of received DAIs is equal to the number of ACKs, the ACK/NACK is set to the number of ACKs (or 1), and otherwise, ACK/NACK=0. If an SPS PDSCH is present, ACK for this is included. For example, it is assumed that the number of DAIs is 2, and one SPS PDSCH is present. If the total number of ACKs is 3, ACK/NACK=3.

(2) ACK counter: ACK/NACK is set to the number of ACKs corresponding to a DAI value which continuously increases starting from a 1$^{st}$ DAI value. For example, if reception of a PDSCH corresponding to a 1$^{st}$ DAI fails, ACK/NACK=O. If reception of a PDSCH corresponding to 1$^{st}$ to 3$^{rd}$ DAIs is successful but reception of a PDSCH corresponding to a 4$^{th}$ DAI fails, ACK/NACK=3.

If ACK/NACK is 2 bits, a modulo-3 operation can be applied. If the ACK counter method is used and a TDD configuration with DL:UL=9:1 is considered, ACK/NACK can be expressed as follows.

If the number of ACKs (or NACK or DTX) is 0, ACK/NACK=0

If the number of ACKs is 1 or 4 or 7, ACK/NACK=1

If the number of ACKs is 2 or 5 or 8, ACK/NACK=2

If the number of ACKs us 3 or 6 or 9, ACK/NACK=3

Meanwhile, the SPS PDSCH and the dynamic PDSCH can be simultaneously scheduled in a specific UL subframe. In this case, the BS may drop the SPS PDSCH and schedule the dynamic PDSCH. This is called SPS overriding.

In the SPS overriding, if the UE fails to receive the PDCCH, an ACK/NACK error may occur since the UE expects the SPS PDSCH.

Figure 9:
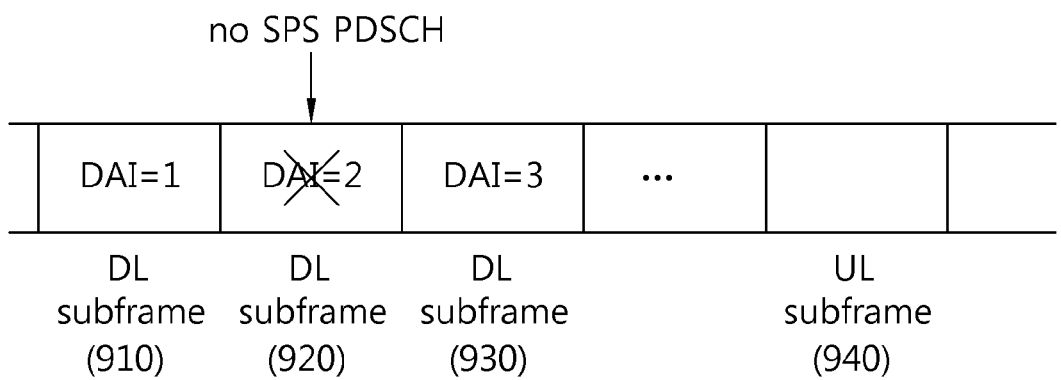
FIG. 9 shows an example of a positive-acknowledgement (ACK)/negative-acknowledgement (NACK) error.

FIG. 9 shows an example of an ACK/NACK error.

It is considered that there are 3 DL subframes 910, 920, and 930 associated with a UL subframe 940. That is, M=3. The value M or the three consecutive DL subframes 910, 920, and 930 are for exemplary purposes only.

It is assumed that, in the 1$^{st}$ DL subframe 910, a UE receives a PDCCH with DAI=1, and an ACK/NACK state of a corresponding PDSCH is ACK.

In the 2$^{nd}$ DL subframe 920, the SPS overriding occurs, and thus a BS transmits a PDCCH with DAI=2 instead of transmitting the SPS PDSCH. It is assumed that the UE fails to receive the PDCCH with DAI=2. The UE cannot know the SPS overriding since the UE fails to receive a dynamic PDCCH. Therefore, the UE recognizes that reception of the SPS PDSCH fails in the 2$^{nd}$ DL subframe 920, and determines the ACK/NACK state as 'NACK'. However, from the perspective of the BS, a correct ACK/NACK state is 'DTX'. Accordingly, ACK/NACK mismatch may occur between the BS and the UE.

The mismatch can be solved by using a last received DAI.

It is assumed that, in the 3$^{rd}$ DL subframe 930, the UE receives a PDCCH with DAI=3, and an ACK/NACK state of a corresponding PDSCH is ACK. Since the UE receives DAI=3 after receiving DAI=1, the UE knows missing of DAI=2. Therefore, in the 2$^{nd}$ DL subframe 920, the UE recognizes that SPS overriding exists and the ACK/NACK state is 'DTX'. As a result, the ACK/NACK mismatch can be solved.

Hereinafter, the scheduled PDSCH may include a dynamic PDSCH and a static PDSCH. The dynamic PDSCH is a PDSCH with a corresponding PDCCH. That is, the dynamic PDSCH is a PDSCH indicated by the PDCCH. The static PDSCH is a PDSCH without a corresponding PDCCH. An example of the static PDSCH is an SPS PDSCH.

Now, ACK/NACK transmission on a PUCCH using ACK/NACK channel selection will be described according to an embodiment of the present invention.

It is assumed that an ACK/NACK state for each transport block is expressed by up to 4 states by using 2 bits, and a 2-bit ACK/NACK counter is applied.

In the following table, 'A' denotes ACK, 'N' denotes NACK, 'D' denotes DTX', and 'any' denotes any one of ACK, NACK, and DTX.

Hereinafter, a value of the ACK counter is for exemplary purposes only, and the present invention is not limited thereto. The number of bits of the ACK/NACK counter may be greater than or equal to 1 bit or 2 bits. Alternatively, instead of the ACK counter, a method of expressing the proposed ACK/NACK mapping can be applied.

In the TDD configuration of Table 5 above, if M=4, the value of the ACK counter can be expressed by Table 8 below.

TABLE 8

| HARQ-ACK(1), HARQ-ACK(2), HARQ-ACK(3), HARQ-ACK(4) | ACK counter |
|---|---|
| A, A, A, N/D | 3 |
| A, A, N/D, any | 2 |
| (A, N/D, any, any) or (A, A, A, A) | 1 |
| (N/D, any, any, any) | 0 |

Hereinafter, HARQ-ACK(m) (1≤m≤M) can be defined as follows, with respect to a corresponding serving cell.

(1) When SPS is absent.

If M=1, spatial bundling is not applied, and an individual ACK/NACK state for each codeword is transmitted as an ACK/NACK response.

If M=2, spatial bundling is applied, HARQ-ACK(1) corresponds to a 1$^{st}$ associated DL subframe, and HARQ-ACK(2) corresponds to a 2$^{nd}$ associated DL subframe.

If M=3 or 4, spatial bundling is applied, and HARQ-ACK (j), 1≤j≤M, corresponds to PDSCH transmission in which a DAI included in a PDCCH has a value j.

(2) When SPS is present.

If M=1, spatial bundling is not applied, and an individual ACK/NACK state for each codeword is transmitted as an ACK/NACK response.

If M=2, spatial bundling is applied, HARQ-ACK(1) corresponds to a 1$^{st}$ associated DL subframe, and HARQ-ACK(2) corresponds to a 2$^{nd}$ associated DL subframe.

If M=3 or 4, spatial bundling is applied, HARQ-ACK(1) is ACK/NACK for a PDSCH without a PDCCH, and HARQ-ACK(j), 2≤j≤M, corresponds to PDSCH transmission in which a DAI included in the PDCCH has a value j−1.

Spatial bundling implies ACK/NACK bundling for codewords in respective DL subframes for each serving cell. For example, if a DL transport block in a DL subframe includes two codewords, bundled ACK/NACK is acquired by performing a binary AND operation on ACK/NACK bits with respect to the two codewords.

According to Table 8 above, two ACK/NACK states, i.e., (A, N/D, any, any) and (A, A, A, A), are mapped to an ACK counter value (i.e., 1) in an overriding manner. This implies that the BS cannot distinguish (A, N/D, any, any) and (A, A, A, A) when the received ACK/NACK counter value is 1. Even if the UE actually transmits (A, N/D, any, any), the BS may recognize it as (A, A, A, A). On the contrary, even if the UE actually transmits (A, A, A, A), the BS may recognize it as (A, N/D, any, any). This implies that, if the BS schedules a PDSCH in all of four subframes, it may cause HARQ performance deterioration.

In order to reduce the HARQ performance deterioration caused by overriding mapping of the ACK/NACK state, ACK/NACK mapping of Table 9 or Table 10 below is proposed.

TABLE 9

| HARQ-ACK(1), HARQ-ACK(2), HARQ-ACK(3), HARQ-ACK(4) | ACK/NACK counter |
|---|---|
| A, A, A, N/D | 3 |
| A, A, N/D, any | 2 |
| (A, D, D, D) or (A, A, A, A) | 1 |
| (N/D, any, any, any) or (A, N/D, any, any), except for (A, D, D, D) | 0 |

TABLE 10

| HARQ-ACK(1), HARQ-ACK(2), HARQ-ACK(3), HARQ-ACK(4) | ACK/NACK counter |
|---|---|
| A, A, A, N/D | 3 |
| (A, A, D, D) or (A, A, A, A) | 2 |
| A, N/D, any, any | 1 |
| (N/D, any, any, any) or (A, A, N/D, any), except for (A, A, D, D) | 0 |

In Table 9, all of the remaining states except for the bundled DTX (it implies "(D, any, any, any)") can be mapped to the ACK counter value 0 by being included in the bundled NACK (it implies an ACK/NACK state mapped to the ACK counter value 0). That is, according to Table 9, the bundled NACK is "(N, any, any, any) or (A, N/D, any, any), except for (A, D, D, D)".

In Table 9, only (A, D, D, D) is mapped to the ACK counter value 1 in an overriding manner together with (A, A, A, A), and (A, N/D, any, any) except for (A, D, D, D) is mapped to the ACK counter value 0. This is because a probability that an ACK/NACK state for four scheduled PDSCHs is (A, D, D, D), that is, a probability that reception of three PDSCHs sequentially scheduled continuously fails, is significantly low. In this manner, an HARQ ACK/NACK error can be reduced.

According to Table 10, (A, A, D, D) and (A, A, A, A) are mapped to the ACK counter value 2 in an overriding manner, and (A, A, N/D, any) except for (A, A, D, D) is mapped to the ACK counter value 0. Regarding four scheduled PDSCHs, a probability that (A, A, D, D) which is mapped in an overriding manner together with (A, A, A, A) occurs is increased to some extent in comparison with (A, D, D, D) of Table 5 above, whereas the number of ACK/NACK states for the ACK counter value 0 can be decreased.

In Table 10, all of the remaining states other than the bundled DTX can be mapped by being included in the bundled NACK. That is, according to Table 10, the bundled NACK is "(N, any, any, any) or (A, A, N/D, any), except for (A, A, D, D)".

On the basis of Tables 9 and 10 above, a 2-bit ACK/NACK counter to be applied to channel selection of Table 6 can be acquired.

When two serving cells are present, channel selection can be performed as shown in Table 11 or 12 below, by using the 2-bit ACK/NACK state acquired from each serving cell.

TABLE 11

| ACK/NACK state for 1$^{st}$ serving cell | ACK/NACK state for 2$^{nd}$ serving cell | Resource | Constellation |
|---|---|---|---|
| D | N/D | N/D | N/D | No Tx |
| N | N/D | N/D | N/D | H0 | +1 |
| A | N/D | N/D | N/D | H0 | −1 |
| N/D | A | N/D | N/D | H1 | −j |
| A | A | N/D | N/D | H1 | +j |
| N/D | N/D | A | N/D | H2 | +1 |
| A | N/D | A | N/D | H2 | +j |
| N/D | A | A | N/D | H2 | −j |
| A | A | A | N/D | H2 | −1 |
| N/D | N/D | N/D | A | H3 | +1 |
| A | N/D | N/D | A | H0 | −j |
| N/D | A | N/D | A | H3 | +j |
| A | A | N/D | A | H0 | +j |
| N/D | N/D | A | A | H3 | −j |
| A | N/D | A | A | H3 | −1 |
| N/D | A | A | A | H1 | +1 |
| A | A | A | A | H1 | −1 |

TABLE 12

| ACK/NACK state for 1$^{st}$ serving cell | ACK/NACK state for 2$^{nd}$ serving cell | Resource | Constellation |
|---|---|---|---|
| D | D | N/D | N/D | No Tx |
| N | N/D | N/D | N/D | H0 | +1 |
| D | N | N/D | N/D | H0 | +1 |
| A | N/D | N/D | N/D | H0 | −1 |
| N/D | A | N/D | N/D | H0 | −j |
| A | A | N/D | N/D | H0 | −1 |
| N/D | N/D | A | N/D | H3 | +j |
| A | N/D | A | N/D | H2 | +1 |
| N/D | A | A | N/D | H1 | +1 |
| A | A | A | N/D | H1 | +j |
| N/D | N/D | N/D | A | H3 | +1 |
| A | N/D | N/D | A | H2 | +j |
| N/D | A | N/D | A | H3 | −j |
| A | A | N/D | A | H2 | −1 |
| N/D | N/D | A | A | H3 | −1 |
| A | N/D | A | A | H2 | −j |
| N/D | A | A | A | H1 | −j |
| A | A | A | A | H1 | −1 |

Herein, 'No Tx' denotes no transmission to the PUCCH, and H0, H1, H2, and H3 denote a resource index $n^{(1)}_{PUCCH}$ for the PUCCH.

If the 1$^{st}$ serving cell is a primary cell and the 2$^{nd}$ serving cell is a secondary cell, the followings are defined.

H0 and H1 for the primary cell can be defined as follows.

In the presence of SPS, H0 is a resource index given in advance through higher layer signaling for the SPS, and H1 is a resource index acquired from a PDCCH with a DAI value 1.

In the absence of the SPS, H0 and H1 are resource indices acquired from PDCCHs with DAI values 1 and 2, respectively.

H2 and H3 for the secondary cell can be defined as follows.

If a PDSCH of the secondary cell is indicated through the PDCCH of the primary cell (this is called cross scheduling), H2 and H3 are resource indices acquired from PDCCHs with DAI values 1 and 2, respectively.

If a PDSCH of the secondary cell is indicated through the PDCCH of the secondary cell (this is called non-cross scheduling), H2 and H3 are resource indices determined according to a higher layer configuration.

Meanwhile, a resource index for an ACK/NACK state including DTX can be acquired from any PDCCH resource for a PDCCH for scheduling a serving cell corresponding to the DTX. This is because the resource index cannot be acquired since the DTX implies a failure in reception of a PDCCH indicating a scheduled PDSCH.

For this reason, in Table 11 and Table 12, an ACK/NACK state of (N/D, N/D, N/D, N/D) is decoupled as follows. This is called N/D decoupling.

Table 11: (N, N/D, N/D, N/D) is mapped to H0. Transmission of (D, N/D, N/D, N/D) is dropped.

Table 12: (N, N/D, N/D, N/D) or (D, N, N/D, N/D) is mapped to H0. Transmission of (D, D, N/D, N/D) is dropped.

The ACK counter value needs to be expressed in a format of a 2-bit ACK/NACK state of (any, any) in order to apply the ACK counter value of Tables 9 and 10 above to Tables 11 and 12.

Table 13 below shows an example of mapping the ACK counter value to the 2-bit ACK/NACK state.

TABLE 13

| ACK counter | ACK/NACK state for $1^{st}$ serving cell or $2^{nd}$ serving cell |
|---|---|
| 0 | (N, N) or (D, D) |
| 1 | (A, N) or (A, D) |
| 2 | (N, A) or (D, A) |
| 3 | (A, A) |

When applying the aforementioned N/D decoupling to the mapping of Table 13, decoupling is required for (N/D, N/D) mapped to the ACK counter value 0.

Table 14 shows an example of applying decoupling.

TABLE 14

| ACK counter | ACK/NACK state for $1^{st}$ serving cell or $2^{nd}$ serving cell |
|---|---|
| 0 (bundled DTX) | (D, D) |
| 0 (bundled NACK) | (N, N) |
| 1 | (A, N) or (A, D) |
| 2 | (N, A) or (D, A) |
| 3 | (A, A) |

For another method, it can be considered a method in which the bundled NACK is defined to the ACK counter value 0, and the bundled DTX is treated as DTX (i.e., no data reception or no PDCCH reception). Table 15 shows an example of applying this method.

TABLE 15

| ACK counter bundled DTX | ACK/NACK state for $1^{st}$ serving cell or $2^{nd}$ serving cell (D, D) |
|---|---|
| 0 | (N, N) |
| 1 | (A, N) or (A, D) |
| 2 | (N, A) or (D, A) |
| 3 | (A, A) |

According to Table 14 and Table 15 above, an ACK/NACK state of (N/D, N/D, N/D, N/D), i.e., (ACK counter value of $1^{st}$ serving cell, ACK counter value of $2^{nd}$ serving cell)=(0, 0)), can be decoupled as follows.

(ACK counter value of $1^{st}$ serving cell, ACK counter value of $2^{nd}$ serving cell)=(bundled NACK, 0) is mapped to (N, N, N/D, N/D) and H0.

(ACK counter value of $1^{st}$ serving cell, ACK counter value of $2^{nd}$ serving cell)=(bundled DTX, 0) is mapped to (D, D, N/D, N/D) and transmission drop.

The decoupling is required because, when the first serving cell is a bundled NACK, it implies that at least one PDCCH (e.g., a PDCCH corresponding to a DAI value 1) is received in the first serving cell, and thus a PUCCH resource can be acquired.

Now, if M=2, 3, 4, the proposed channel selection will be described in detail by taking an example.

In the TDD configuration of Table 5 above, if M=2, the ACK/NACK state can be expressed by Table 16 or Table 17 below.

TABLE 16

| HARQ-ACK(1), HARQ-ACK (2) | ACK/NACK state |
|---|---|
| A, A | A, A |
| N, A | N/D, A |
| A, N/D | A, N/D |
| (N, N/D) or (D, any) | N/D, N/D |

In the above table, {HARQ-ACK(1), HARQ-ACK(2)}= (N, N/D) can be mapped to the ACK/NACK state of (N, N). Alternatively, {HARQ-ACK(1), HARQ-ACK(2)}=(D, any) can be mapped to the ACK/NACK state of (D, D).

TABLE 17

| HARQ-ACK(1), HARQ-ACK(2) | ACK/NACK state |
|---|---|
| A, A | A, A |
| N/D, A | N/D, A |
| A, N/D | A, N/D |
| N/D, N/D | N/D, N/D |

In the above table, {HARQ-ACK(1), HARQ-ACK(2)}= (N, N/D) can be mapped to the ACK/NACK state of (N, N). Alternatively, {HARQ-ACK(1), HARQ-ACK(2)}=(D, N/D) can be mapped to the ACK/NACK state of (D, D).

If M=3, the ACK/NACK state can be expressed by Table 18 below.

TABLE 18

| HARQ-ACK(1), HARQ-ACK(2), HARQ-ACK(3) | ACK/NACK state |
|---|---|
| A, A, A | A, A |
| A, A, N/D | N/D, A |
| A, N/D, any | A, N/D |
| N/D, any, any | N/D, N/D |

In the above table, {HARQ-ACK(1), HARQ-ACK(2), HARQ-ACK(3)}=(N, any, any) can be mapped to the ACK/NACK state of (N, N). Alternatively, {HARQ-ACK(1), HARQ-ACK(2), HARQ-ACK(3)}=(D, any, any) can be mapped to the ACK/NACK state of (D, D).

If M=4, the ACK/NACK state can be expressed by Table 19 below.

TABLE 19

| HARQ-ACK(1), HARQ-ACK(2), HARQ-ACK(3), HARQ-ACK(4) | ACK/NACK state |
|---|---|
| A, A, A, N/D | A, A |
| A, A, N/D, any | N/D, A |
| (A, D, D, D) or (A, A, A, A) | A, N/D |
| (N/D, any, any, any) or (A, N/D, any, any), except for (A, D, D, D) | N/D, N/D |

In the above table, {HARQ-ACK(1), HARQ-ACK(2), HARQ-ACK(3), HARQ-ACK(4)}='(N, any, any, any) or (A, N/D, any, any), except for (A, D, D, D)' can be mapped to the ACK/NACK state of (N, N). Alternatively, {HARQ-ACK(1), HARQ-ACK(2), HARQ-ACK(3), HARQ-ACK(4)}=(D, any, any, any) can be mapped to the ACK/NACK state of (D, D).

Assume that QPSK modulation is given as follows.

TABLE 20

| b(0)b(1) | Constellation |
|---|---|
| 00 | 1 |
| 01 | −j |
| 10 | j |
| 11 | −1 |

If M=3, the ACK/NACK state of Table 18 can be applied to Table 11, which is summarized as follows.

TABLE 21

| HARQ-ACK(1), HARQ-ACK(2), and HARQ-ACK(3) for 1st serving cell | HARQ-ACK(1), HARQ-ACK(2), and HARQ-ACK(3) for 2nd serving cell | Resource | Constellation b(0)b(1) |
|---|---|---|---|
| A, A, A | A, A, A | H1 | 11 |
| A, A, N/D | A, A, A | H1 | 00 |
| A, N/D, any | A, A, A | H3 | 11 |
| N/D, any, any | A, A, A | H3 | 01 |
| A, A, A | A, A, N/D | H0 | 10 |
| A, A, N/D | A, A, N/D | H3 | 10 |
| A, N/D, any | A, A, N/D | H0 | 01 |
| N/D, any, any | A, A, N/D | H3 | 00 |
| A, A, A | A, N/D, any | H2 | 11 |
| A, A, N/D | A, N/D, any | H2 | 01 |
| A, N/D, any | A, N/D, any | H2 | 10 |
| N/D, any, any | A, N/D, any | H2 | 00 |
| A, A, A | N/D, any, any | H1 | 10 |
| A, A, N/D | N/D, any, any | H1 | 01 |
| A, N/D, any | N/D, any, any | H0 | 11 |
| N, any, any | N/D, any, any | H0 | 00 |
| D, any, any | N/D, any, any | | No Tx |

If M=4, the ACK/NACK state of Table 19 can be applied to Table 11, which is summarized as follows.

TABLE 22

| HARQ-ACK(1), HARQ-ACK(2), HARQ-ACK(3), and HARQ-ACK(4) for 1st serving cell | HARQ-ACK(1), HARQ-ACK(2), HARQ-ACK(3), and HARQ-ACK(4) for 2nd serving cell | Resource | Constellation b(0)b(1) |
|---|---|---|---|
| A, A, A, N/D | A, A, A, N/D | H1 | 11 |
| A, A, N/D, any | A, A, A, N/D | H1 | 00 |
| A, D, D, D | A, A, A, N/D | H3 | 11 |
| A, A, A, A | A, A, A, N/D | H3 | 11 |
| N/D, any, any, any | A, A, A, N/D | H3 | 01 |
| (A, N/D, any, any), except for (A, D, D, D) | A, A, A, N/D | H3 | 01 |
| A, A, A, N/D | A, A, N/D, any | H0 | 10 |
| A, A, N/D, any | A, A, N/D, any | H3 | 10 |
| A, D, D, D | A, A, N/D, any | H0 | 01 |
| A, A, A, A | A, A, N/D, any | H0 | 01 |
| N/D, any, any, any | A, A, N/D, any | H3 | 00 |
| (A, N/D, any, any), except for (A, D, D, D) | A, A, N/D, any | H3 | 00 |
| A, A, A, N/D | A, D, D, D | H2 | 11 |
| A, A, A, N/D | A, A, A, A | H2 | 11 |
| A, A, N/D, any | A, D, D, D | H2 | 01 |
| A, A, N/D, any | A, A, A, A | H2 | 01 |
| A, D, D, D | A, D, D, D | H2 | 10 |
| A, D, D, D | A, A, A, A | H2 | 10 |
| A, A, A, A | A, D, D, D | H2 | 10 |
| A, A, A, A | A, A, A, A | H2 | 10 |
| N/D, any, any, any | A, D, D, D | H2 | 00 |
| N/D, any, any, any | A, A, A, A | H2 | 00 |
| (A, N/D, any, any), except for (A, D, D, D) | A, D, D, D | H2 | 00 |
| (A, N/D, any, any), except for (A, D, D, D) | A, A, A, A | H2 | 00 |
| A, A, A, N/D | N/D, any, any, any | H1 | 10 |
| A, A, A, N/D | (A, N/D, any, any), except for (A, D, D, D) | H1 | 10 |
| A, A, N/D, any | N/D, any, any, any | H1 | 01 |
| A, A, N/D, any | (A, N/D, any, any), except for (A, D, D, D) | H1 | 01 |
| A, D, D, D | N/D, any, any, any | H0 | 11 |
| A, D, D, D | (A, N/D, any, any), except for (A, D, D, D) | H0 | 11 |
| A, A, A, A | N/D, any, any, any | H0 | 11 |
| A, A, A, A | (A, N/D, any, any), except for (A, D, D, D) | H0 | 11 |
| N, any, any, any | N/D, any, any, any | H0 | 00 |
| N, any, any, any | (A, N/D, any, any), except for (A, D, D, D) | H0 | 00 |
| (A, N/D, any, any), except for (A, D, D, D) | N/D, any, any, any | H0 | 00 |
| (A, N/D, any, any), except for (A, D, D, D) | (A, N/D, any, any), except for (A, D, D, D) | H0 | 00 |
| D, any, any, any | N/D, any, any, any | | No Tx |
| D, any, any, any | (A, N/D, any, any), except for (A, D, D, D) | | No Tx |

Figure 10:
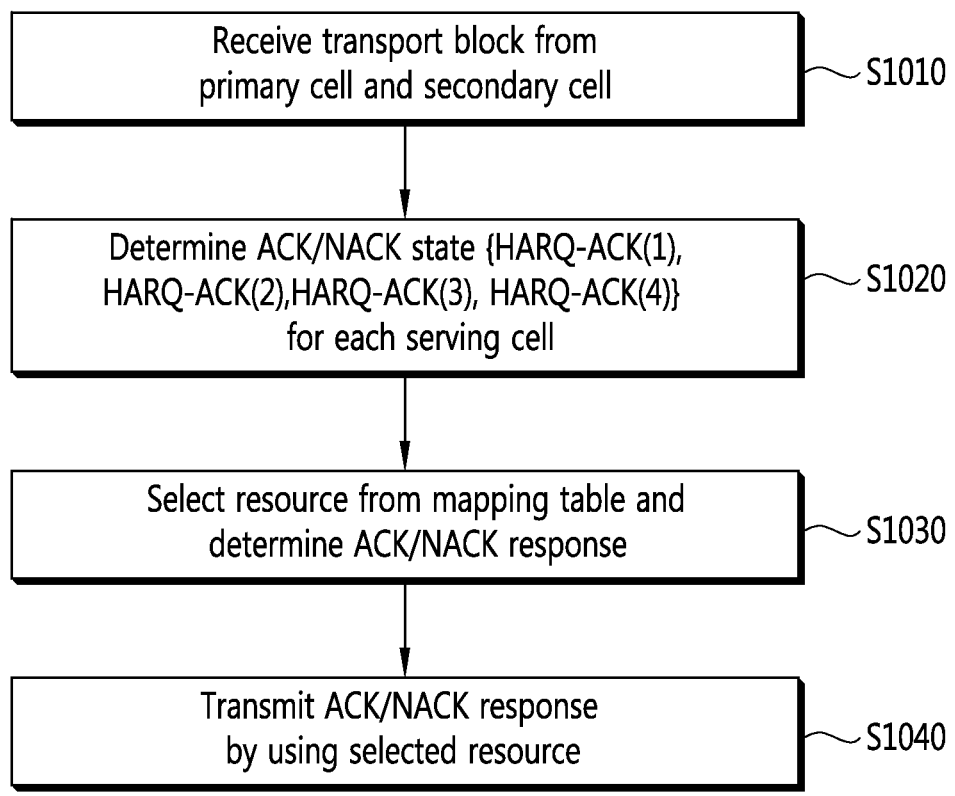
FIG. 10 shows an example of ACK/NACK transmission according to an embodiment of the present invention.

FIG. 10 is a flowchart showing ACK/NACK transmission according to an embodiment of the present invention.

Assume that M=4, and a first cell and a second cell are present as a serving cell.

In step S1010, a UE receives zero or more DL transport blocks in M DL subframes from each serving cell through a PDSCH. The PDSCH is dynamically scheduled by a PDCCH, or may be an SPS PDSCH. The UE receives zero or more DL transport blocks in M DL subframes from the primary cell through the PDSCH. The UE receives zero or more DL transport blocks in M DL subframes from the secondary cell through the PDSCH.

In step S1020, the UE determines an ACK/NACK state for each serving cell. More specifically, an ACK/NACK state {HARQ-ACK(1),HARQ-ACK(2),HARQ-ACK(3),HARQ-ACK(4)} of the primary cell and an ACK/NACK state {HARQ-ACK(1),HARQ-ACK(2),HARQ-ACK(3),HARQ-ACK(4)} of the secondary cell are acquired. In this case, an ACK/NACK state of each serving cell is one of (A, A, A, N/D), (A, A, N/D, any), (A, D, D, D), (A, A, A, A), (N/D, any, any, any) and (A, N/D, any, any) except for (A, D, D, D) as shown in Table 9 (or equivalently in Table 19).

In addition, the UE also determines H0, H1, H2, and H3 as described above.

In step S1030, the UE selects a resource from a mapping table, and determines an ACK/NACK response. The mapping table of Table 22 is taken into account.

For example, if the ACK/NACK state of the primary cell is (A, D, D, D) and an ACK/NACK state of the secondary cell is (A, A, A, N), according to Table 22, a selected resource is H3, and b(0)b(1)=11. If the ACK/NACK response is b(0)b(1), when the ACK/NACK response is subjected to QPSK modulation, it becomes d(0) for a PUCCH format 1b. Further, H3 becomes a resource index for the PUCCH format 1b. On the basis of H3, an orthogonal sequence index i, a cyclic shift index $I_{cs}$, and a resource block index m can be acquired to configure a PUCCH.

In step S1030, the UE transmits an ACK/NACK response through the PUCCH.

Although ACK/NACK transmission on the PUCCH using resource selection is described herein, the proposed invention is also applicable to various schemes in which the ACK counter mapping of Table 9 and Table 10 is applied.

Now, a method of determining a resource for channel selection and of configuring a DCI will be described.

As described above, in Table 21 and Table 22, H2 and H3 for the secondary cell can be defined differently for cross scheduling or non-cross scheduling. In the cross scheduling, a PDSCH of the secondary cell is indicated by using a PDCCH of the primary cell, and H2 and H3 are resource indices acquired from PDCCHs with DAI values 1 and 2, respectively. In the non-cross scheduling, a PDSCH of the secondary cell is indicated by using the PDCCH of the secondary cell, H2 and H3 are resource indices determined according to a higher layer configuration.

In the higher layer configuration, the BS firsts reports a plurality of available candidate resource indices to the UE by using an RRC message. Further, the BS reports a resource index selected from the plurality of candidate resource indices by using a DL grant on a PDCCH. A field indicating the selected resource index in the DL grant is called an ACK/NACK resource indicator (ARI).

For example, the BS reports four candidate resource index pairs to the UE by using the RRC message. Further, the BS uses the ARI on the PDCCH for scheduling the PDSCH to indicate one of the four candidate resource indices. The selected resource index pairs are H2 and H3.

In order to prevent the increase in the number of DL grants, the ARI uses a transmit power command (TPC) of the conventional DCI.

Hereinafter, a PDCCH for scheduling a primary cell is called a PCC-PDCCH, and a PDCCH for scheduling a secondary cell is called an SCC-PDCCH.

In the TDD configuration with M=2, 3, 4, if it is considered to apply Tables 16 to 19 above, the SCC-PDCCH for requiring the ARI and a reason thereof are as follows.

(1) SCC-PDCCH with DAI value 1 in Table 16.

Regarding HARQ-ACK(1,2) of the secondary cell, H2 or H3 can be selected in case of (A, N/D) or (N, A) or (A, A). Since HARQ-ACK(1) is always 'A' or 'N', the ARI is required in an SCC-PDCCH with a DAI value 1. Therefore, a field used in the ARI in the SCC-PDCCH, of which the DAI value is not 1, can be used as the conventional TPC or for other usages.

(2) SCC-PDCCH with DAI value 1 or 2 in Table 17.

Regarding HARQ-ACK(1,2) of the secondary cell, H2 or H3 can be selected/transmitted in case of (A, N/D) or (A, A). Since HARQ-ACK(1) is always 'A', the ARI is required in an SCC-PDCCH with a DAI value 1. In case of (N/D, A), the HARQ-ACK(1) may be 'D', and thus the ARI is required for the SCC-PDCCH with a DAI value 1 or 2.

(3) SCC-PDCCH with DAI value 1 in Table 18.

Regarding HARQ-ACK(1, 2, 3) of the secondary cell, H2 or H3 can be selected/transmitted in case of (A, N/D, any) or (A, A, N/D) or (A, A, A). Since HARQ-ACK(1) is always 'A', the ARI is required in an SCC-PDCCH with a DAI value 1. Therefore, a field used in the ARI in the SCC-PDCCH, of which the DAI value is not 1, can be used as the conventional TPC or for other usages.

(4) SCC-PDCCH with DAI value 1 in Table 19.

Regarding HARQ-ACK(1, 2, 3, 4) of the secondary cell, H2 or H3 can be selected in case of (A, D, D, D) or (A, A, A, A) or (A, A, N/D, any) or (A, A, A, N/D). Since HARQ-ACK(1) is always 'A', the ARI is required in an SCC-PDCCH with a DAI value 1. Therefore, a field used in the ARI in the SCC-PDCCH, of which the DAI value is not 1, can be used as the conventional TPC or for other usages.

According to the aforementioned result, the ARI of the SCC-PDCCH can be used for different meanings according to the DAI value.

In one embodiment, it can be defined such that the ARI is transmitted only through the SCC-PDCCH with a DAI value 1, and regarding the SCC-PDCCH having another DAI value, TPC is transmitted instead of the ARI, or the ART is not used.

In another embodiment, it can be defined such that the ARI is transmitted only through an SCC-PDCCH with a DAI value 1 or 2, and regarding an SCC-PDCCH having another DAI value, TPC is transmitted instead of the ARI, or the ARI is not used.

When applying the ACK counter-to-ACK/NACK state mapping of Table 14 and Table 15, H0 and H1 are resource indices linked to PCC-PDCCHs with DAI values of 1 and 2, respectively, and H2 and H3 are resource indices linked to SCC-PDCCHs with DAI values of 1 and 2, respectively. This is because mapping is made to (A, N/D) having an ACK counter value 1 in a primary cell and a secondary cell. This implies that even if a UE receives one PCC-PDCCH and/or one SCC-PDCCH with a DAI value 1, normal ACK/NACK resource selection is possible.

More specifically, assume that the UE receives only one PCC-PDCCH with a DAI value 1. Only H0 which is a PUCCH resource linked to a corresponding PDCCH is acquired, and H1 is not acquired. There is a need to allow a normal operation of ACK/NACK resource selection even if only one PCC-PDCCH with a DAI value 1 is received and thus H1 is not defined. If an ACK/NACK state in which an ACK counter value of the primary cell corresponds to 1 (or bundled DTX) is not mapped to H1, the ACK/NACK resource selection can operate normally. Similarly, if an ACK/NACK state in which an ACK counter value of the secondary cell is 1 (or bundled DTX) is not mapped to H3, the ACK/NACK resource selection can operate normally.

Figure 11:
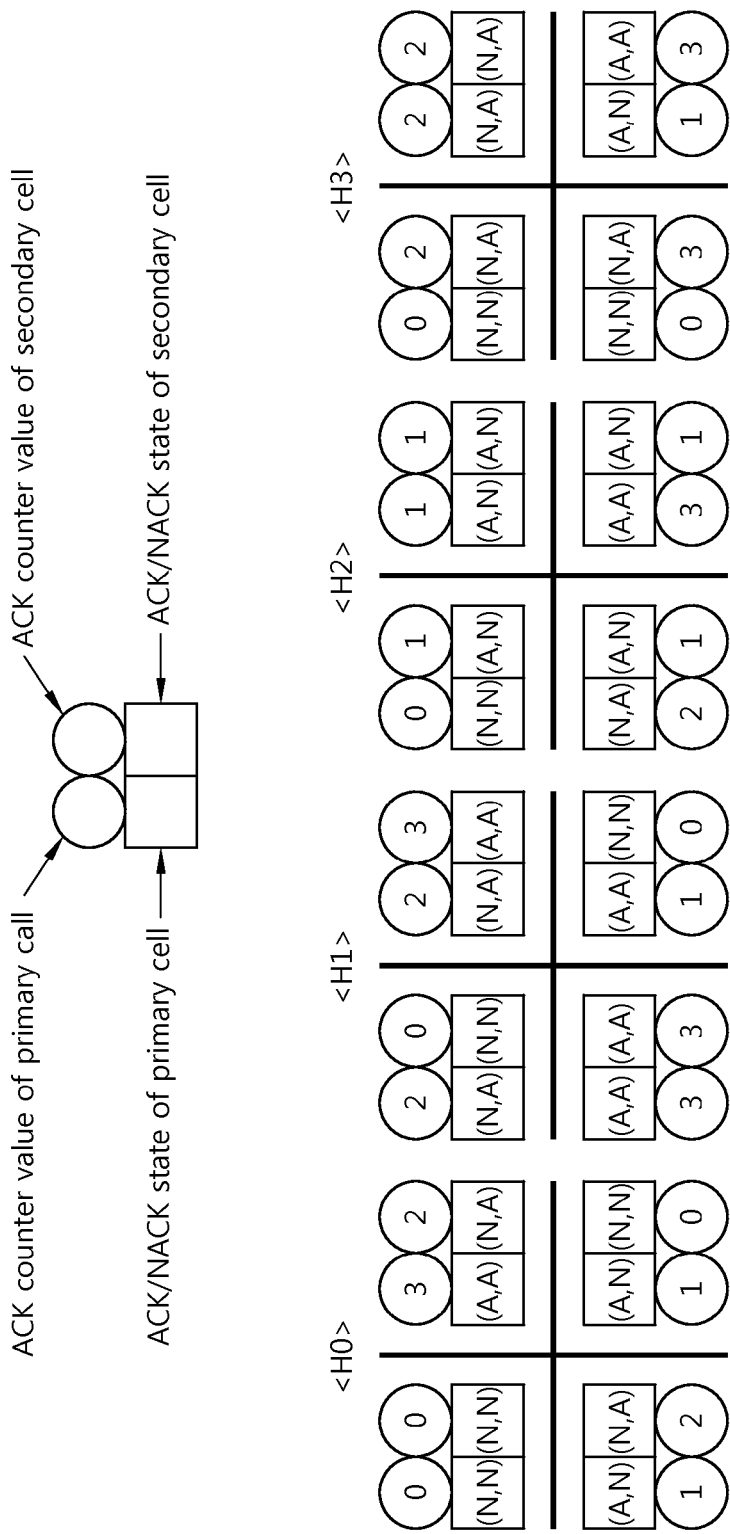
FIG. 11 shows ACK counter-to-ACK/NACK state mapping.

FIG. 11 shows ACK counter-to-ACK/NACK state mapping.

It shows a constellation and a resource when the ACK counter-to-ACK/NACK state mapping of Table 14 and Table 15 is applied to Table 11.

An ACK counter value 1 of a primary cell, i.e., (A, N), is not mapped to H1, and an ACK counter value 1 of a secondary cell, i.e., (A, N), is not mapped. Thus, PUCCH resource allocation based on a DAI is possible.

For each resource, a sum of differences of ACK counter values between adjacent QPSK symbols is 14 in H0, 14 in H1, 6 in H2, and 6 in H3. This indicates a total sum of ACK-to-NACK errors or NACK-to-ACK errors. In addition, a maximum difference value of ACK counters between adjacent QPSK symbols is 5. This indicates the maximum number of ACK-to-NACK errors or NACK-to-ACK errors. Therefore, the number of ACK/NACK errors is concentrated on H0/H1 in comparison with H2/H3, and up to 5 serious NACK-to-ACK errors may occur.

Hereinafter, a method of reducing a difference of ACK/NACK errors between resources while supporting DAI-based PUCCH resource allocation will be described.

In order to support the DAI-based PUCCH resource allocation, an ACK counter value 0 of primary and secondary cells is mapped to (N, N), and an ACK counter value 0 of the primary and secondary cells is mapped to (A, N).

Figure 12:
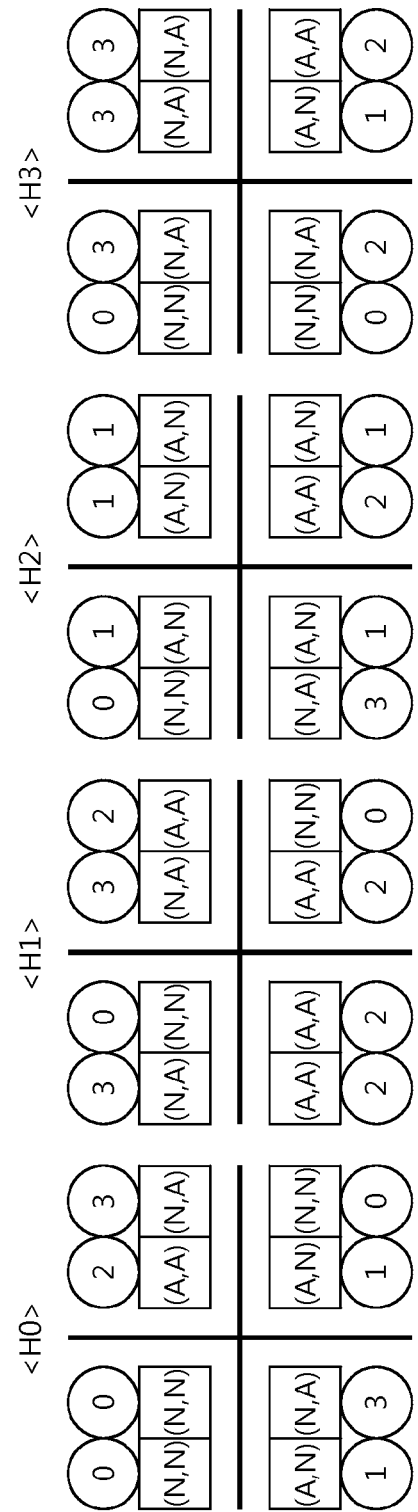
FIG. 12 shows a first example of the proposed ACK counter-to-ACK/NACK state mapping.

FIG. 12 shows a first example of the proposed ACK counter-to-ACK/NACK state mapping.

An ACK counter value 2 of a primary cell is mapped to (A, A), and an ACK counter value 3 of the primary cell is mapped to (N, A). An ACK counter value 2 of a secondary cell is mapped to (A, A), and an ACK counter value 3 of the secondary cell is mapped to (N, A).

For each resource, a sum of differences of ACK counter values between adjacent QPSK symbols is 16 in H0, 10 in H1, 6 in H2, and 8 in H3. A maximum difference value of ACK counters between adjacent QPSK symbols is 5.

Figure 13:
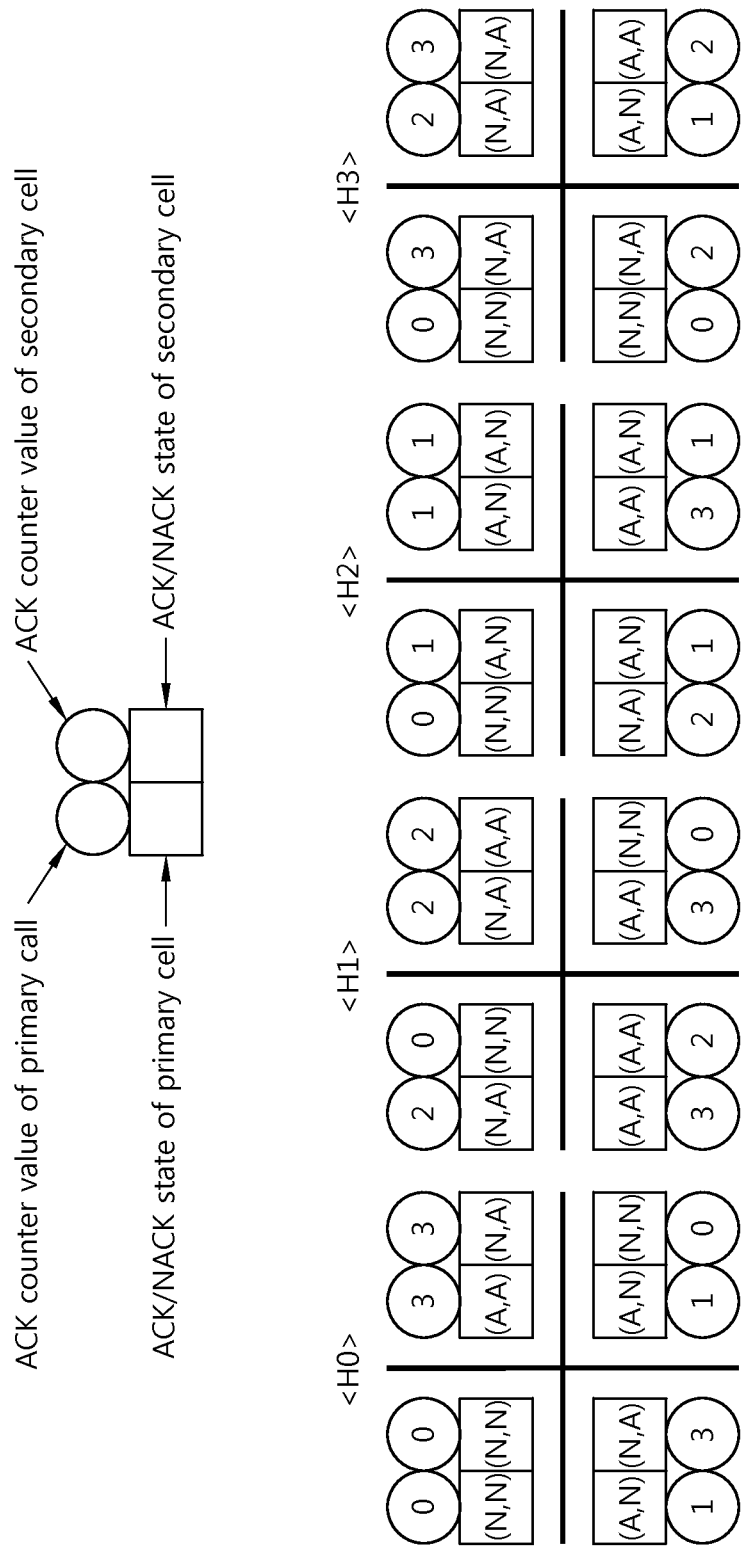
FIG. 13 shows a second example of the proposed ACK counter-to-ACK/NACK state mapping.

FIG. 13 shows a second example of the proposed ACK counter-to-ACK/NACK state mapping.

An ACK counter value 2 of a primary cell is mapped to (N, A), and an ACK counter value 3 of the primary cell is mapped to (A, A). An ACK counter value 2 of a secondary cell is mapped to (A, A), and an ACK counter value 3 of the secondary cell is mapped to (N, A).

For each resource, a sum of differences of ACK counter values between adjacent QPSK symbols is 18 in H0, 10 in H1, 6 in H2, and 6 in H3. A maximum difference value of ACK counters between adjacent QPSK symbols is 6.

Figure 14:
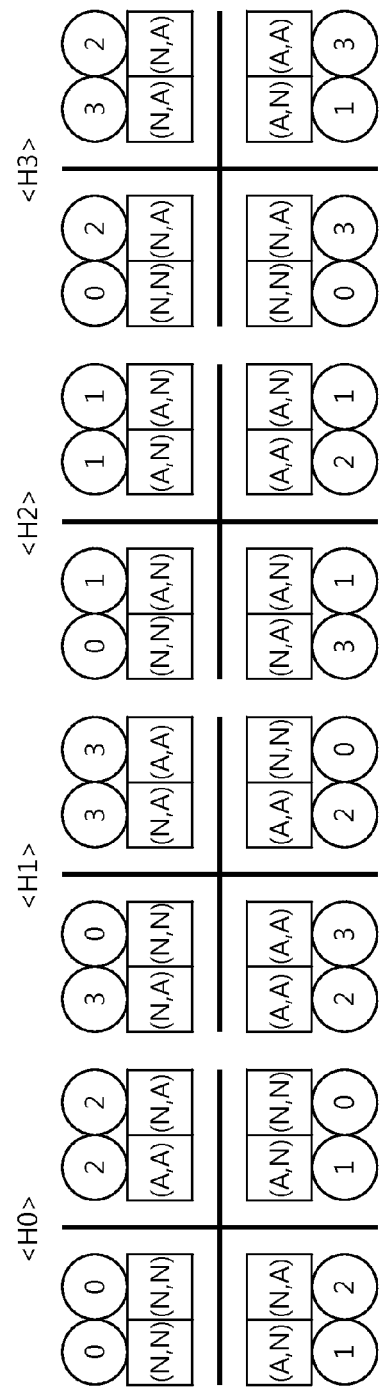
FIG. 14 shows a third example of the proposed ACK counter-to-ACK/NACK state mapping.

FIG. 14 shows a third example of the proposed ACK counter-to-ACK/NACK state mapping.

An ACK counter value 2 of a primary cell is mapped to (A, A), and an ACK counter value 3 of the primary cell is mapped to (N, A). An ACK counter value 2 of a secondary cell is mapped to (N, A), and an ACK counter value 3 of the secondary cell is mapped to (A, A).

For each resource, a sum of differences of ACK counter values between adjacent QPSK symbols is 12 in H0, 14 in H1, 6 in H2, and 8 in H3. A maximum difference value of ACK counters between adjacent QPSK symbols is 4.

When applying the mapping of FIG. 14, not only the DAI-based PUCCH resource allocation is possible but also an ACK/NACK error is less than other mapping.

Therefore, the ACK counter-to-ACK/NACK state mapping of the following table can be applied.

TABLE 23

| ACK counter of primary cell | ACK counter of secondary cell | ACK/NACK state |
|---|---|---|
| 0 (bundled DTX) | 0 (bundled DTX) | (D, D) |
| 0 (bundled NACK) | 0 (bundled NACK) | (N, N) |
| 1 | 1 | (A, N) or (A, D) |
| 3 | 2 | (N, A) or (D, A) |
| 2 | 3 | (A, A) |

TABLE 24

| ACK counter of primary cell | ACK counter of secondary cell | ACK/NACK state |
|---|---|---|
| bundled DTX | bundled DTX | (D, D) |
| 0 (bundled NACK) | 0 (bundled NACK) | (N, N) |
| 1 | 1 | (A, N) or (A, D) |
| 3 | 2 | (N, A) or (D, A) |
| 2 | 3 | (A, A) |

Figure 15:
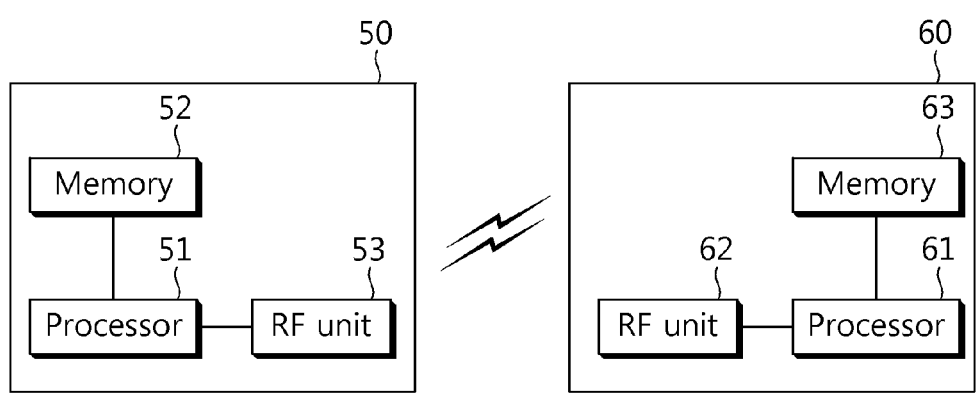
FIG. 15 is a block diagram showing a wireless apparatus for implementing an embodiment of the present invention.

FIG. 15 is a block diagram showing a wireless apparatus for implementing an embodiment of the present invention.

A UE 50 includes a processor 51, a memory 52, and a radio frequency (RF) unit 53. The memory 52 is coupled to the processor 51, and stores a variety of information for driving the processor 51. The RF unit 53 is coupled to the processor 51, and transmits and/or receives a radio signal. The processor 51 implements the proposed functions, procedures, and/or methods. The processor 51 can implement the operation of the UE according to the aforementioned embodiments. The processor 51 may configure ACK/NACK, and may transmit the ACK/NACK through a PUSCH or a PUCCH.

A BS 60 includes a processor 61, a memory 63, and an RF unit 62. The memory 63 is coupled to the processor 61 and stores a variety of information for driving the processor 61. The RF unit 62 is coupled to the processor 61, and transmits and/or receives a radio signal. The processor 61 implements the proposed functions, procedures, and/or methods. The processor 61 can implement the operation of the BS (or cell) in the aforementioned embodiments. The processor 61 may transmit a DL transport block, and may receive ACK/NACK through a PUSCH or a PUCCH.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method of transmitting an ACK/NACK in a wireless communication system based on Time Division Duplex in which M, M=4, downlink subframes are associated with an uplink subframe, the method comprising:
   receiving, by a user equipment, at least one downlink transport block in the M downlink subframes for each of a plurality of serving cells from a base station;
   receiving, by the user equipment, zero or more downlink transport blocks in the M downlink subframes from a first serving cell;
   determining, by the user equipment, ACK/NACK states {HARQ-ACK(1),HARQ-ACK(2),HARQ-ACK(3), HARQ-ACK(4)} for the first serving cell;
   determining, by the user equipment, an ACK/NACK response based on the ACK/NACK states; and
   transmitting, by the user equipment, the ACK/NACK response in the uplink subframe, wherein each downlink transport block is received on each physical downlink shared channel (PDSCH) and a PDSCH is indicated by a downlink resource assignment in a downlink grant on a corresponding physical downlink control channel (PDCCH), and the downlink grant includes a downlink assignment index (DAI) which indicates an accumulative number of PDCCH with assigned PDSCH transmission,
   wherein the ACK/NACK states {HARQ-ACK(1),HARQ-ACK(2),HARQ-ACK(3), HARQ-ACK(4)} are determined among possible ACK/NACK states, the possible ACK/NACK states comprising at least six states of (A, A, A, N/D), (A, A, N/D, any), (A, D, D, D), (A, A, A, A), (N/D, any, any, any) and (A, N/D, any, any) except for (A, D, D, D), where 'A' indicates ACK for a corresponding downlink transport block, 'N' indicates NACK for a corresponding downlink transport block, 'D' indicates no transmission (DTX) in a corresponding downlink subframe, and 'any' indicates any of ACK, NACK and DTX, and
   wherein HARQ-ACK(j), j=1,2,3,4, is ACK/NACK/DTX for a corresponding downlink transport block on PDSCH with a DAI value j in the corresponding PDCCH.

2. The method of claim 1, wherein if there is a PDSCH transmission without a corresponding PDCCH in the first serving cell, HARQ-ACK(1) for the first serving cell is ACK/NACK/DTX for a corresponding downlink transport block at the PDSCH without a corresponding PDCCH, and HARQ-ACK(j), j=2,3,4, for the first serving cell is ACK/NACK/DTX for a corresponding downlink transport block on a PDSCH with a DAI value j−1 in the corresponding PDCCH.

3. The method of claim 2, further comprising:
   receiving, by the user equipment, zero or more downlink transport blocks in the M downlink subframes from a second serving cell; and
   determining, by the user equipment, ACK/NACK states {HARQ-ACK(1), HARQ-ACK(2), HARQ-ACK(3), HARQ-ACK(4)} for the second serving cell.

4. The method of claim 3, wherein the ACK/NACK response is determined based on a following table:

| HARQ-ACK(1), HARQ-ACK(2), HARQ-ACK(3), HARQ-ACK(4) for the first serving cell | HARQ-ACK(1), HARQ-ACK(2), HARQ-ACK(3), HARQ-ACK(4) for the second serving cell |
|---|---|
| A, A, A, N/D | A, A, A, N/D |
| A, A, N/D, any | A, A, A, N/D |
| A, D, D, D | A, A, A, N/D |
| A, A, A, A | A, A, A, N/D |
| N/D, any, any, any | A, A, A, N/D |
| (A, N/D, any, any), except for (A, D, D, D) | A, A, A, N/D |
| A, A, A, N/D | A, A, N/D, any |
| A, A, N/D, any | A, A, N/D, any |
| A, D, D, D | A, A, N/D, any |
| A, A, A, A | A, A, N/D, any |
| N/D, any, any, any | A, A, N/D, any |
| (A, N/D, any, any), except for (A, D, D, D) | A, A, N/D, any |
| A, A, A, N/D | A, D, D, D |
| A, A, A, N/D | A, A, A, A |
| A, A, N/D, any | A, D, D, D |
| A, A, N/D, any | A, A, A, A |
| A, D, D, D | A, D, D, D |
| A, D, D, D | A, A, A, A |
| A, A, A, A | A, D, D, D |
| A, A, A, A | A, A, A, A |
| N/D, any, any, any | A, D, D, D |
| N/D, any, any, any | A, A, A, A |
| (A, N/D, any, any), except for (A, D, D, D) | A, D, D, D |
| (A, N/D, any, any), except for (A, D, D, D) | A, A, A, A |
| A, A, A, N/D | N/D, any, any, any |
| A, A, A, N/D | (A, N/D, any, any), except for (A, D, D, D) |
| A, A, N/D, any | N/D, any, any, any |
| A, A, N/D, any | (A, N/D, any, any), except for (A, D, D, D) |
| A, D, D, D | N/D, any, any, any |
| A, D, D, D | (A, N/D, any, any), except for (A, D, D, D) |
| A, A, A, A | N/D, any, any, any |
| A, A, A, A | (A, N/D, any, any), except for (A, D, D, D) |
| N, any, any, any | N/D, any, any, any |
| N, any, any, any | (A, N/D, any, any), except for (A, D, D, D) |
| (A, N/D, any, any), except for (A, D, D, D) | N/D, any, any, any |
| (A, N/D, any, any), except for (A, D, D, D) | (A, N/D, any, any), except for (A, D, D, D) |
| D, any, any, any | N/D, any, any, any |
| D, any, any, any | (A, N/D, any, any), except for (A, D, D, D) |

5. A wireless device configured for transmitting an ACK/NACK in a wireless communication system based on Time Division Duplex in which M, M=4, downlink subframes are associated with an uplink subframe, the wireless device comprising:
   a radio frequency unit configured to transmit radio signals; and
   a processor operatively coupled with the radio frequency unit and configured to:
      receive at least one downlink transport block in the M downlink subframes for each of a plurality of serving cells from a base station;
      receive zero or more downlink transport blocks in the M downlink subframes from a first serving cell;
      determine ACK/NACK states {HARQ-ACK(1), HARQ-ACK(2), HARQ-ACK(3),HARQ-ACK(4)} for the first serving cell;
      determine, by the user equipment, an ACK/NACK response based on the ACK/NACK states; and
      transmit the ACK/NACK response in the uplink subframe,
   wherein each downlink transport block is received on each physical downlink shared channel (PDSCH) and a PDSCH is indicated by a downlink resource assignment in a downlink grant on a corresponding physical downlink control channel (PDCCH), and the downlink grant includes a downlink assignment index (DAI) which indicates an accumulative number of PDCCH with assigned PDSCH transmission, wherein the ACK/NACK states {HARQ-ACK(1),HARQ-ACK(2), HARQ-ACK(3), HARQ-ACK(4)} are determined among possible ACK/NACK states, the possible ACK/NACK states comprising at least six states (A, A, A, N/D), (A, A, N/D, any), (A, D, D, D), (A, A, A, A), (N/D, any, any, any), and (A, N/D, any, any) except for (A, D, D, D), where 'A' indicates ACK for a corresponding downlink transport block, 'N' indicates NACK for a corresponding downlink transport block, 'D' indicates no transmission (DTX) in a corresponding downlink subframe, and 'any' indicates any of ACK, NACK and DTX, and wherein HARQ-ACK(j), j=1,2,3,4, is ACK/NACK/DTX for corresponding downlink transport block on a PDSCH with a DAI value j in the corresponding PDCCH.

6. The wireless device of claim 5, wherein if there is a PDSCH transmission without a corresponding PDCCH in the first serving cell, HARQ-ACK(1) for the first serving cell is ACK/NACK/DTX for a corresponding downlink transport block at the PDSCH without a corresponding PDCCH, and HARQ-ACK(j), j=2,3,4, for the first serving cell is ACK/NACK/DTX for a corresponding downlink transport block on PDSCH with a DAI value j−1 in the corresponding PDCCH.

7. The wireless device of claim 6, wherein the processor is configured to:

receive zero or more downlink transport blocks in the M downlink subframes from a second serving cell; and determine ACK/NACK states {HARQ-ACK(1),HARQ-ACK(2),HARQ-ACK(3), HARQ-ACK(4)} for the second serving cell.

* * * * *